United States Patent [19]

Ohashi et al.

[11] Patent Number: 5,531,110
[45] Date of Patent: Jul. 2, 1996

[54] METHOD AND APPARATUS FOR ESTIMATING DISTURBANCE ACTING ON VEHICLE TIRED WHEEL BASED ON WHEEL ANGULAR VELOCITY AND EQUATION OF STATE

[75] Inventors: Hideki Ohashi; Hiroyuki Kawai, both of Susono; Hiroyoshi Kojima, Nishio; Nobuo Hiraiwa, Toyota; Katsuhiro Asano, Toyoake; Takaji Umeno, Aichi-ken; Toshimichi Takahashi, Nagoya, all of Japan

[73] Assignees: Toyota Jidosha Kabushiki Kaisha; Kabushiki Kaisha Toyota Chuo Kenkyusho, both of Aichi-ken, Japan

[21] Appl. No.: 280,214

[22] Filed: Jul. 25, 1994

[30] Foreign Application Priority Data

Jul. 30, 1993 [JP] Japan .................................. 5-190204
May 24, 1994 [JP] Japan .................................. 6-109397

[51] Int. Cl.$^6$ ...................... G01M 17/013; G01M 17/02
[52] U.S. Cl. ...................... 73/146; 73/146.2; 364/571.02; 364/571.04
[58] Field of Search ...................... 73/146, 146.2, 73/862.326, 862.328; 364/565, 571.01, 571.02, 571.04

[56] References Cited

U.S. PATENT DOCUMENTS

| | | | |
|---|---|---|---|
| 4,149,140 | 4/1979 | Evans et al. | 73/146 X |
| 4,224,597 | 9/1980 | DiCecio | 73/146 X |
| 4,817,421 | 4/1989 | Himmler | 73/146 |
| 5,299,131 | 3/1994 | Haas et al. | 364/565 X |
| 5,343,741 | 9/1994 | Nishihara et al. | 73/146.2 |

FOREIGN PATENT DOCUMENTS

| | | |
|---|---|---|
| 62-149502 | 7/1987 | Japan . |
| 62-149503 | 7/1987 | Japan . |
| 5-79934 | 3/1993 | Japan . |
| 5-133831 | 5/1993 | Japan . |

*Primary Examiner*—Richard Chilcot
*Assistant Examiner*—Joseph L. Felber
*Attorney, Agent, or Firm*—Oliff & Berridge

[57] ABSTRACT

The invention is a method and apparatus wherein a disturbance acting on a tired wheel of a vehicle is estimated by a disturbance observer on the basis of the detected angular velocity of the wheel. In one form of the method, the wheel angular velocity is compensated for the disturbance, depending upon the amount of change of the wheel angular velocity caused by the disturbance. In another form of the method, the angular acceleration of the wheel as well as the disturbance is estimated by the observer, and the moment of inertia of the wheel is obtained according to a relationship between the estimated disturbance and angular acceleration of the wheel.

26 Claims, 20 Drawing Sheets

FIG. 5

WHEEL SPEED VARIATION OBTAINING ROUTINE

- S1: $n=1,\ i=1,\ V=0,\ v_n=0\ (n=1\sim j)$
- S2: READING VEHICLE SPEED V
- S3: CALCULATING WHEEL SPEED $v_n$
- S4: CALCULATING $\sum (V - v_n)$
- S5: $n = n + 1$
- S6: $n \leq j$ ? — YES → S2; NO ↓
- S7: $n = 1,\ i = i + 1$
- S8: $i \leq N$ ? — YES → S2; NO ↓
- S9: CALCULATING $\Delta v_n / V$ CORRESPONDING TO EACH TOOTH 16

END

FIG. 7
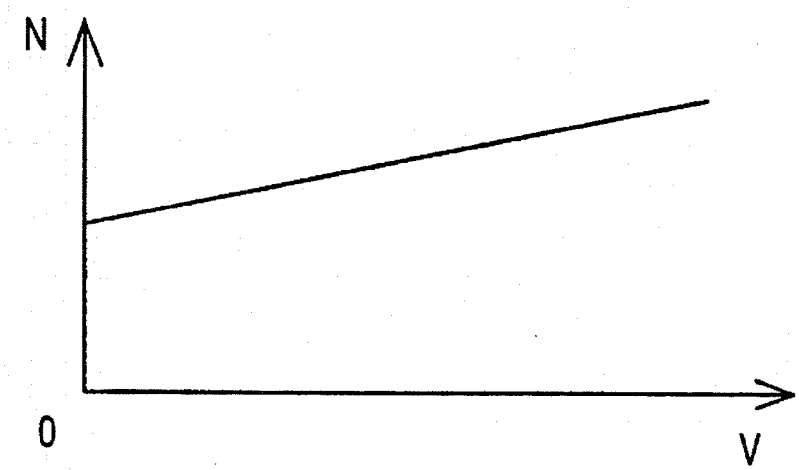
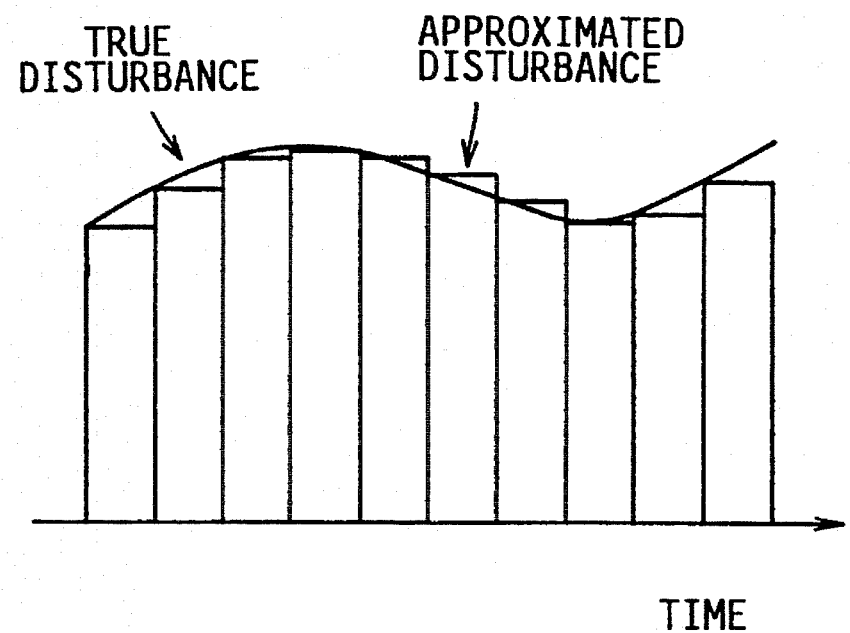
FIG. 8

METHOD AND APPARATUS FOR ESTIMATING DISTURBANCE ACTING ON VEHICLE TIRED WHEEL BASED ON WHEEL ANGULAR VELOCITY AND EQUATION OF STATE

BACKGROUND OF THE INVENTION

1. Field of the Invention

The present invention relates to an apparatus adapted to detect disturbances or noises which influence a tired wheel (hereinafter referred to as "vehicle wheel" or "wheel") of a motor vehicle, and a method of using such disturbance detecting apparatus.

2. Discussion of the Related Art

For controlling a motor vehicle, it is useful and significant to know the behaviors and changing characteristics of the wheels of the vehicle, because the wheels are the only components at which the vehicle contacts a road surface. However, it is not easy to directly detect the behaviors and the changing characteristics of the vehicle wheels during running of the vehicle, since the wheels are attached to the body of the vehicle through a suspension system such that the wheels are displaceable relative to the vehicle body, and since the wheels are rotated.

For a motor vehicle equipped with wheels having tires that are inflated by compressed air so as to maintain a suitable degree of elasticity, for example, the air pressure in the tires has an important effect or influence on the operating characteristics of the wheels. Accordingly, it is desirable to detect the air pressure levels of the wheel tires, but the detection of the tire pressure is also difficult.

The air pressure of a wheel tire may be detected by a pneumatic pressure sensor attached thereto. However, it is not easy to transmit the output of the sensor on the rotating tire to a desired position on the vehicle body while the vehicle is running. It is also possible to determine the tire pressure on the basis of a change in the distance between the road surface and the vehicle body, which change occurs due to deformation of the wheel tire as the tire pressure is lowered. Further, it is possible to estimate a decrease of the tire pressure of one or more wheels as compared with the tire pressure of the other wheels, depending upon the detected rotating speeds of the wheels, based on a fact that the tire pressure decreases with an increase in the rotating speed. However, these methods do not assure accurate detection of the tire pressure. In particular, the latter method does not permit the detection of a decrease of the tire pressure of any wheel if the tire pressure levels of all the wheels whose speeds are detected are lowered.

In the light of the difficulty in detecting a change in the tire pressure of a vehicle wheel, JP-A-62-149502 proposes a tire pressure detecting apparatus which operates depending on a fact that the tire pressure changes with an amount or rate of change of the rotating speed of the corresponding wheel when an external force acting on the wheel varies for some reason, for example, when the wheel passes a raised portion of the road surface. Since the maximal value of the amount of change of the rotating speed of the wheel decreases with a decrease in the tire pressure, the tire pressure can be estimated on the basis of the detected maximal value of the wheel speed change amount. The tire pressure detecting apparatus in question includes signal generating means for generating a signal when the detected amount of change of the wheel speed is higher than a predetermined threshold value, and tire pressure estimating means responsive to that signal, for estimating the tire pressure on the basis of the maximal value of the wheel speed change amount.

However, the condition of the road surface that permits the above-indicated apparatus to detect the tire pressure is limited. Described in detail, the tire pressure can be estimated from the maximal value of the detected wheel speed change amount, only where the relevant wheel runs over a single projection on the road surface. When the wheel passes successive projections and recesses on a bumpy or washboard road surface, changes of the rotating speed of the wheel due to those projections and recesses overlap each other, whereby the maximum value of the detected wheel speed change amount is not commensurate with the tire pressure, making it impossible to effect accurate detection of the tire pressure.

While the difficulty of detecting the tire pressure of the vehicle wheel has been described above by way of example, it has been difficult to detect the changing states of the other characteristics of the vehicle wheel and/or tire, such as the rotating speed, acceleration and eccentricity of the wheel, replacement of the metal wheel member per se, wear of the tire, and attachment of a foreign matter to the tire.

While it would be easy to estimate the behavior and the changing characteristics of a vehicle wheel if the disturbance or noise which acts on the wheel and influence its behavior and changing characteristics could be accurately detected, there is known no apparatus capable of accurately detecting the disturbance acting on the vehicle wheel.

SUMMARY OF THE INVENTION

It is a first object of the present invention to provide an apparatus capable of detecting a disturbance or noise which acts on a rotating wheel of a motor vehicle.

It is a second object of this invention to provide a method of detecting the behavior and changing characteristics of such vehicle wheel, using such a disturbance detecting apparatus.

The first object indicated above may be achieved according to a first aspect of the present invention, which provides disturbance detecting apparatus for detecting a disturbance acting on a tired wheel of a motor vehicle, comprising: an angular velocity detecting device for detecting an angular velocity of the tired wheel; and a disturbance observer for estimating the disturbance acting on the tired wheel, on the basis of at least the angular velocity of the tired wheel detected by the angular velocity detecting device. The disturbance observer estimates the disturbance as one of variables of state of the tired wheel. For instance, the disturbance observer is designed according to a dynamic model of the tired wheel in which the disturbance acts on an integral rotating body having a given moment of inertia.

The disturbance which acts on the tired wheel is not limited to that given to the wheel from the road surface due to its irregularity. While the disturbance given by the road surface irregularity is generally the largest one of the components of the overall disturbance, the tired wheel may suffer from other disturbance components such as those due to a change or variation in the moment of inertia or air pressure of the tire. The moment of inertia of the tired wheel varies due to wear of the tire, attachment of some foreign matter to the tire, and replacement of the tire or metal wheel member with a new one. If necessary, the individual disturbance components arising from different sources may be estimated by analyzing the varying state of the disturbance, so that selected components of the disturbance or the other components are eliminated.

The disturbance detecting apparatus constructed according to the present invention permits easy estimation of the disturbance based on at least the angular velocity of the tired wheel, which disturbance is impossible or difficult to be detected by the conventional apparatus.

The second object indicated above may be achieved according to a second aspect of this invention, which provides a method of compensating an angular velocity of a tired wheel of a motor vehicle, comprising the steps of: obtaining an amount of change of an angular velocity of the tired wheel on the basis of a disturbance acting on the wheel, which disturbance is detected by a disturbance detecting apparatus constructed as described above and which causes the amount of change of the angular velocity; and compensating the angular velocity of the tired wheel as detected by an angular velocity detecting device of the disturbance detecting apparatus, on the basis of the amount of change of the angular velocity.

Described in detail, the angular velocity of the tired wheel detected by the angular velocity detecting device is compensated by the amount of change of the angular velocity which has been obtained on the basis of the disturbance which acts on the tired wheel and which is estimated by the disturbance detecting apparatus described above. Thus, the present method is one application of the disturbance detecting apparatus of the invention.

The angular velocity of the wheel may be used to estimate the running speed of the vehicle. In this case, an average angular velocity of the wheel is obtained to estimate the vehicle speed, since the average angular velocity will not be undesirably influenced by a relatively high-frequency periodic variation of the angular velocity. However, where the angular velocity of the wheel is used to estimate the wheel speed for regulating the wheel braking force or traction force in an anti-lock or traction-control manner so as to prevent excessive slipping of the wheel during braking or acceleration of the vehicle, it is desirable that a relatively high-frequency periodic variation of the angular velocity of the wheel due to a disturbance given to the wheel from the road surface be eliminated from the detected angular velocity. This desire may be met by the angular velocity compensating method according to the present invention, which is capable of detecting the angular velocity of the tired wheel with higher accuracy than the known method, even when the angular velocity changes at a relatively high rate.

The second object indicated above may also be achieved according to a third aspect of this invention, which provides a method of obtaining an amount of change of a moment of inertia of a tired wheel of a motor vehicle, comprising the steps of: operating a disturbance detecting apparatus constructed as described above, to estimate an angular acceleration of the tired wheel as well as a disturbance acting on the tired wheel; and obtaining an amount of change of a moment of inertia of the tired wheel according to a relationship between the disturbance and the angular acceleration of the tired wheel.

The present method of obtaining the amount of change of the moment of inertia of the tired wheel is another application of the disturbance detecting apparatus of the invention. Namely, the angular acceleration of the wheel can be calculated from the angular velocity detected by the angular velocity detecting device of the disturbance detecting apparatus. The amount of change of the moment of inertia of the wheel can be obtained according to a relationship between the calculated angular acceleration of the wheel and the disturbance estimated by the disturbance observer. An analysis of the changing state of the moment of inertia of the tired wheel provides information on various changes of the tired wheel. If the situation indicates that a change of the moment of inertia of the tired wheel is caused solely by the wear of the tire, for example, the amount of wear of the tire may be estimated from the amount of change of the moment of inertia. Usually, the wear of the tire is reflected by a relatively slow or gradual decrease of the moment of inertia of the tired wheel. If the moment of inertia increases during a particular run of the vehicle, it suggests attachment of some foreign matter to the tire, for example, insertion of a stone in a tread groove of the tire. If the moment of inertia of the tired wheel abruptly changes immediately after a start of the vehicle, it indicates replacement of at least one of the metal wheel member and tire of the tired wheel.

Information other than that obtained by the disturbance observer as used in the above method may be used to eliminate a selected component or the other components of the disturbance. For example, information that a change of the moment of inertia of the tired wheel takes place during running of the vehicle makes it possible to judge that the detected change is not caused by replacement of the metal wheel member. In other words, the judgement requires, for instance, information that the angular velocity of the tired wheel continues to be higher than zero, or information that the power-on switch of the vehicle continues to be ON.

Further, it is possible to determine whether a braking force is applied to the wheel or not, depending on an output signal of a brake switch provided to detect an operation of a brake, e.g., an operation of a brake pedal, or an output signal of a pressure sensor provided to detect the pressure of the brake fluid (in a wheel brake cylinder, for example). It is also possible to determine whether a driving torque is applied to the drive wheel or not, depending on the operating position of an accelerator pedal.

It is also possible to estimate the magnitude of the disturbance applied to the wheel from the road surface, depending on an output signal of a sensor adapted to detect the road surface irregularity or reflectance.

Thus, the method according to the third aspect of this invention makes it possible to detect the amount of change of the moment of inertia of the tired wheel, which can be utilized to detect wear of the tire, attachment of a foreign matter to the tire, and replacement of the tire and/or metal wheel member of the tired wheel. In addition, the present method is useful to improve the disturbance estimating accuracy of the disturbance observer, since the moment of inertia used as a parameter of the disturbance observer can be adjusted on the basis of the detected amount of change of the moment of inertia.

In one advantageous form of the disturbance detecting apparatus according to the present invention, a torque detector is provided for detecting at least one of a driving torque and a braking torque applied to the tired wheel, and the disturbance observer estimates the disturbance on the basis of at least the angular velocity of the tired wheel and the driving torque and/or the braking torque. Since the driving torque and/or the braking torque as well as the angular velocity of the wheel is/are used by the disturbance observer to estimate the disturbance, the accuracy of estimation of the disturbance can be improved irrespective of the particular running condition of the vehicle, e.g., positive driving condition (with drive forces applied from the engine to the driving wheels), negative driving condition (with brake forces applied to the wheels), or coasting condition (without the drive or brake forces applied to the wheels).

In another advantageous form of the disturbance detecting apparatus, there is provided means for obtaining a variable component of the angular velocity of the tired wheel detected by the angular velocity detecting device, and the disturbance observer estimates the disturbance on the basis of at least the variable component of the angular velocity of the tired wheel.

The means for obtaining the variable component of the angular velocity of the tired wheel may be an analog or digital filter which passes only a high-frequency component of the angular velocity detected by the angular velocity detecting device.

According to a further advantageous form of the disturbance detecting apparatus, the disturbance observer is designed according to a dynamic model of the tired wheel in which a rim and a belt are connected to each other rotatably relative to each other by a torsion spring. In this apparatus, the angular velocity detecting device is adapted to detect an angular velocity of the rim, and the disturbance observer is adapted to estimate the disturbance on the basis of at least the angular velocity of the rim.

In the above form of the apparatus, the angular velocity of the rim of the wheel is detected as distinguished from that of the belt. In this respect, it is noted that the angular velocity of the rim is considered the angular velocity of the metal wheel member of the tired wheel, while the angular velocity of the belt is considered the angular velocity at the outer surface of the tire which contacts the road surface. The angular velocity of the rim can be detected by a suitable known device, which uses, for example, a rotor with teeth formed along its outer periphery, and a magnetic pickup adapted to detect passage of the teeth. On the other hand, the angular velocity of the belt cannot be detected by measurement. However, the angular velocity of the belt can be estimated.

Further, the torsion angle between the rim and the belt of the dynamic model can be estimated, and the amount of change of the spring constant of the torsion spring may be obtained according to a relationship between the estimated disturbance and torsion angle. Since the spring constant of the torsion spring has a close relationship with the air pressure of the tire, a change of the air pressure can be detected by using the advantageous form of the disturbance detecting apparatus described just above.

Accordingly, the second object indicated above may also be achieved according to a further aspect of the present invention, which provides a method of detecting a change of air pressure of a tired wheel of a motor vehicle, using the disturbance detecting apparatus described above. Namely, the method comprises the steps of: operating the disturbance observer described just above, to estimate a torsion angle between the rim and the belt as well as a disturbance acting on the tired wheel; and obtaining an amount of change of air pressure of the tired wheel according to a relationship between the disturbance and the torsion angle.

According to the above method, a change of the air pressure of the tire can be obtained any time, without an influence by the road surface irregularity as experienced on the prior art apparatus disclosed in JP-A-62-149502 discussed above.

The relationship between the disturbance and the torsion angle may be obtained by obtaining successive normalized values of correlation each as a variable representative of a relationship between the disturbance and the torsion angle, by dividing respective cross-correlation functions between the disturbance and torsion angle successively obtained by the disturbance observer, by respective auto-correlation functions of the torsion angle successively obtained by the disturbance observer. Each normalized value of correlation may be obtained each time a predetermined number of estimated values of the disturbance and torsion angle have been obtained. However, this manner of obtaining each normalized value of correlation requires a memory having a relatively large capacity for storing the estimated disturbance and torsion angle values. In view of this drawback, it is desirable to obtain the present normalized value of correlation based on the preceding normalized value of correlation, an influence of a product of the present disturbance value and the present torsion angle value, and an influence of a square of the present torsion angle value. According to the present method, the air pressure of the tire can be continuously detected while minimizing an increase in the required capacity of the memory for storing the normalized values of correlation.

In one preferred arrangement of the above form of the disturbance detecting apparatus wherein the disturbance observer is designed according to the dynamic model including the rim, belt and torsion spring, there are provided means for detecting an amount of change of a moment of inertia of the tired wheel, and means for compensating the moment of inertia of the tired wheel used as a parameter by the disturbance observer, on the basis of the detected amount of change of the moment of inertia of the tired wheel.

According to the above arrangement, the moment of inertia of the tired wheel used as a parameter by the disturbance observer is adjusted by the detected amount of change. Since the moment of inertia of the tired wheel generally remains unchanged, the disturbance observer may use a constant value as the moment of inertia to estimate the disturbance. However, the moment of inertia of the tired wheel may actually vary, and it is therefore preferable to detect the amount of change of this moment of inertia and compensate the moment of inertia used by the observer, for improving the accuracy of estimation of the disturbance.

Another preferred arrangement of the same form of the apparatus further comprises: means for detecting an amount of change of a spring constant of the torsion spring; and means for compensating the spring constant used as a parameter by the disturbance observer, on the basis of the detected amount of change of the spring constant of the torsion spring. In a further preferred arrangement of the same form of the apparatus, the disturbance observer comprises means for estimating a disturbance $w_2$ and a torsion angle $\theta_{RB}$ between the rim and the belt, on the basis of at least the angular velocity $\omega_R$ of the rim. In this arrangement, the apparatus further comprises a constant change detecting device for detecting an amount of change $\Delta K$ of a spring constant $K$ of the torsion spring according to a relationship between the disturbance $w_2$ and the torsion angle $\theta_{RB}$ estimated by the disturbance observer. The disturbance $w_2$ is defined by the following equation:

$$w_2 = (-1/J_B)T_d + (\Delta K/J_B)\theta_{RB}$$

where, $J_B$: a moment of inertia of the belt; and $T_d$: a disturbance torque applied to the belt from a road surface on which the motor vehicle runs.

In the above arrangement, the apparatus may further comprise air pressure detecting means for detecting an amount of change $\Delta P$ of the air pressure of the tired wheel which corresponds to the amount of change ΔK of the spring constant K of the torsion spring detected by the constant change detecting device, and according to a predetermined relationship between the amount of change ΔK and the amount of change ΔP. The apparatus may further comprise means for compensating the spring constant K used as a parameter by the disturbance observer, on the basis of the amount of change ΔK of the spring constant K of the torsion spring detected by the constant change detecting device.

In a still further preferred arrangement of the same form of the apparatus, the disturbance observer comprises means for estimating a disturbance $w_2$ and an angular velocity $\omega_B$ of the belt, on the basis of at least the angular velocity $\omega_R$ of the rim. In this arrangement, the apparatus further comprises a moment of inertia change detecting device for obtaining an angular acceleration $\omega_B'$ of the belt on the basis of the angular velocity $\omega_B$ of the belt estimated by the disturbance observer, and detecting an amount of change $\Delta J_B$ of a moment of inertia $J_B$ of the belt according to a relationship between the disturbance $w_2$ detected by the disturbance observer and the angular acceleration $\omega_B'$ of the belt. The disturbance $w_2$ estimated according to this arrangement is defined by the following equation:

$$w_2 = (-1/J_B)T_d - (\Delta J_B/J_B)\omega_B'$$

where, $T_d$: a disturbance torque applied to the belt from a road surface on which the motor vehicle runs.

In the above arrangement, the apparatus may further comprise means for detecting a foreign matter attached to a tire of the tired wheel, on the basis of the amount of change $\Delta J_B$ of the moment of inertia $J_B$ of the belt detected by the moment of inertia change detecting device.

In the same arrangement, the apparatus may further comprise means for detecting a chain installed on a tire of the tired wheel, on the basis of the amount of change $\Delta J_B$ of the moment of inertia $J_B$ of the belt detected by the moment of inertia change detecting device.

In the same arrangement, the apparatus may further comprise means for detecting an amount of wear of a tire of the tired wheel, on the basis of the amount of change $\Delta J_B$ of the moment of inertia $J_B$ of the belt detected by the moment of inertia change detecting device.

In the same arrangement, the apparatus may further comprise compensating means for compensating the moment of inertia $J_B$ of the belt used as a parameter by the disturbance observer, on the basis of the amount of change $\Delta J_B$ of the moment of inertia $J_B$ detected by the moment of inertia change detecting device.

In a yet further preferred arrangement of the same form of the apparatus, the disturbance observer comprises means for estimating a disturbance $w_1$, on the basis of at least the angular velocity $\omega_R$ of the rim. In this arrangement, the apparatus further comprises a moment of inertia change detecting device for obtaining an angular acceleration $\omega_R'$ of the rim on the basis of the angular velocity $\omega_R$ of the rim estimated by the disturbance observer, and detecting an amount of change $\Delta J_R$ of a moment of inertia $J_R$ of the rim according to a relationship between the disturbance $w_1$ detected by the disturbance observer and the angular acceleration $\omega_R'$ of the rim. The disturbance $w_1$ is defined by the following equation:

$$w_1 = -(\Delta J_R/J_R)\omega_R'.$$

In the above arrangement, the apparatus may further comprise means for detecting replacement of a metal wheel member of the tired wheel, on the basis of the amount of change $\Delta J_R$ of the moment of inertia $J_R$ of the rim detected by the moment of inertia change detecting device.

According to a still further advantageous form of the disturbance detecting apparatus, the disturbance observer is designed according to a dynamic model of the tired wheel in which a rim and a belt are connected to each other rotatably relative to each other by a torsion spring and a damper which are disposed in parallel. In this form of the apparatus, the angular velocity detecting device detects an angular velocity of the rim, and the disturbance observer estimates the disturbance on the basis of at least the angular velocity of the rim. This form of the apparatus provides the same advantages as the apparatus wherein the disturbance observer is designed according to the dynamic model in which the rim and the belt are connected by the torsion spring only. However, the accuracy of estimation of the disturbance by the disturbance observer is improved because the damper as well as the torsion spring is taken into account.

In one preferred arrangement of the above form of the apparatus, the disturbance observer uses the angular velocity of the rim as an equivalent linear displacement velocity $x_R'$ of the rim, and estimates a disturbance $w_2$, an equivalent linear displacement velocity $x_B'$ of the belt and an equivalent relative linear displacement $x_{RB}$ between the rim and the belt, on the basis of at least the equivalent linear displacement velocity $x_R'$ of the rim. In this arrangement, the apparatus further comprises a constant change detecting device for detecting an amount of change $\Delta D_W$ of a damping coefficient $D_W$ of the damper and an amount of change $\Delta K_W$ of a spring constant $K_W$ of the torsion spring, on the basis of the disturbance $w_2$, the equivalent linear displacement velocity $x_B'$, the equivalent relative linear displacement $x_{RB}$ which are estimated by the disturbance observer, and the equivalent linear displacement velocity $x_R'$ which is detected by the angular velocity detecting device. The disturbance $w_2$ estimated in this arrangement is defined by the following equation:

$$w_2 = (\Delta D_W/m_B)(x_R' - x_B') + (\Delta K_W/m_B)x_{RB} + F_d/m_B,$$

where $m_B$: equivalent inertial mass of the belt;

$F_d$: disturbance force equivalent to a disturbance torque applied to the belt from a road surface on which the vehicle runs.

In the above arrangement, the constant change detecting device detects the amount of change $\Delta D_W$ of the damping coefficient $D_W$ and the amount of change $\Delta K_W$ of the spring constant $K_W$ in such a manner that a sum of squares of a difference of the estimated disturbance $W_2$ from a theoretical approximated value of $(\Delta D_W/m_B)(x_R' - x_B') + (\Delta K_W/m_B)x_{RB}$, which squares are obtained at time intervals, is substantially minimized.

In a yet further advantageous form of the detecting apparatus according to the present invention, the disturbance observer is designed according to a dynamic model of the tired wheel connected to a suspension system of the vehicle, in which a sprung mass of the vehicle and the tired wheel as an unsprung mass of the vehicle are connected to each other rotatably relative to each other through the suspension system, and in which a rim and a belt are connected to each other movably relative to each other by a torsion spring. In this form of the apparatus, the disturbance observer estimates the disturbance on the basis of at least the angular velocity of the tired wheel.

In the above form of the apparatus, the suspension system as well as the tired wheel is taken into account in designing the disturbance observer. This permits the observer to perform estimation on a larger number of items and provides an increased amount of information useful to control the vehicle. In addition, the accuracy of estimation of the disturbance by the observer is further improved.

In yet another advantageous form of the apparatus of the present invention, there is provided an inhibiting device adapted to inhibit an operation of the disturbance observer when a difference between a frequency of a periodic variation of the angular velocity of the tired wheel and an optimum frequency at which the disturbance observer estimates the disturbance with high accuracy is not larger than a predetermined value.

Still another advantageous form of the apparatus further comprises: a vehicle speed sensor for detecting a running speed of the vehicle; speed difference calculating means for calculating a difference between the running speed of the vehicle detected by the vehicle speed sensor and the angular velocity of the tired wheel detected by the angular velocity detecting device; periodic variation estimating means for estimating an amount of periodic variation of the angular velocity of the tired wheel on the basis of the difference calculated by the speed difference calculating means; and angular velocity compensating means for compensating the angular velocity of the tired wheel as detected by the angular velocity detecting device, on the basis of the amount of periodic variation estimated by the periodic variation estimating means, so that the disturbance observer receives the angular velocity of the tired wheel which has been compensated by the angular velocity compensating means.

As long as the vehicle is running at a constant speed, the angular velocity of the tired wheel detected by the angular velocity detecting device remains constant, that is, does not vary with time. In the presence of some unavoidable errors of the tired wheel associated with its manufacture, however, the detected angular velocity of the tired wheel will in fact more or less vary with time. Namely, the angular velocity detected by the angular velocity detecting device inevitably includes a component arising from a periodic variation of the angular velocity due to the manufacturing errors. If the disturbance observer is operated to estimate disturbance without considering such periodic variation of the angular velocity of the wheel, the accuracy of estimation of the disturbance would not be necessarily satisfactory.

The above two forms of the apparatus are based on the above analysis. In the former form of the apparatus, the disturbance observer is disabled when the frequency of the periodic variation is relatively close to the optimum frequency of the observer, since the disturbance estimating accuracy is deteriorated as the frequency of the periodic variation becomes closer to the optimum frequency. In the latter form of the apparatus, the amount of such periodic variation of the angular velocity of the wheel relative to the vehicle speed is obtained, and the angular velocity as detected by the angular velocity detecting device is compensated on the basis of the obtained amount of variation, so that the disturbance observer operates according to the compensated angular velocity, whereby the estimating accuracy of the observer is enhanced. These advantageous forms of the apparatus assure improved operating reliability of the disturbance observer, without erroneous estimation of the disturbance due to the inevitable periodic variation of the angular velocity of the tired wheel.

BRIEF DESCRIPTION OF THE DRAWINGS

The above and optional objections, features and advantages of the present invention will be better understood by reading the following detailed description of presently preferred embodiments of the invention, when considered in connection with the accompanying drawings, in which:

FIG. 5 is a flow chart illustrating a routine for obtaining a rotating speed variation of the tired wheel according to a control program stored in a read-only memory of a computer used by the apparatus;

FIG. 7 is a graph indicating a relationship between the number N used in step S8 of the routine of FIG. 5 and vehicle speed V;

FIG. 8 is a graph explaining approximation of the disturbances as detected by the apparatus;

DETAILED DESCRIPTION OF THE PREFERRED EMBODIMENTS

Figure 1:
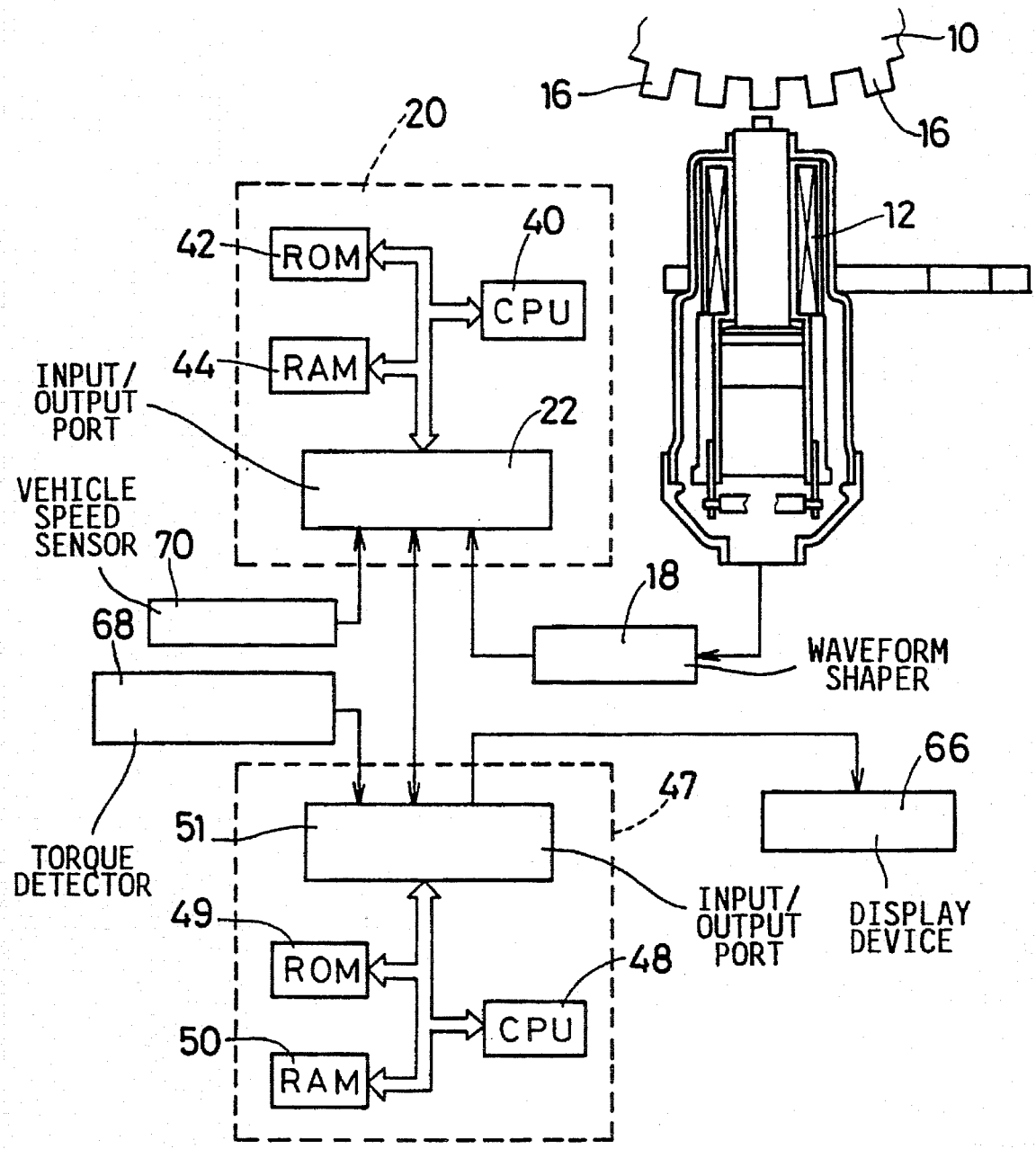
FIG. 1 is a schematic block diagram illustrating one embodiment of a disturbance detecting apparatus of the present invention adapted to detect disturbances which act on tired wheels of an automotive vehicle.
Figure 2:
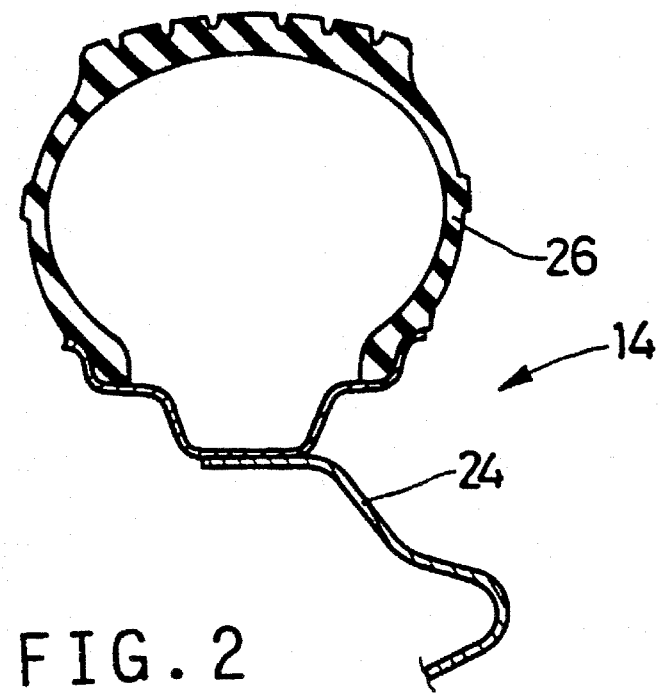
FIG. 2 is a fragmentary cross sectional view of a tired vehicle wheel whose disturbances are detected by the apparatus of FIG. 1.

Referring first to FIGS. 1 and 2, the disturbance detecting apparatus constructed according to the first embodiment of this invention includes a magnetic pickup (variable-reluctance pickup) 12 disposed adjacent to a rotor 10 which rotates with a tired wheel indicated generally at 14 in FIG. 2. The rotor 10 has a multiplicity of teeth 16 formed along its outer periphery such that the teeth 16 are equally spaced apart from each other in the circumferential direction, that is, in the direction of rotation of the rotor 10.

The magnetic pickup 12 is constructed to generate a voltage signal whose amplitude periodically changes as the teeth 16 pass the sensing head of the pickup 12. The waveform of the voltage signal generated by the pickup 12 is shaped into a rectangular pulse form by a waveform shaper 18, and the shaped pulse signal is applied to an input/output port 22 of a computer 20. While only one set of the rotor 10, pickup 12 and waveform shaper 18 is shown in FIG. 1, for illustrative purpose only, the motor vehicle equipped with the present disturbance detecting apparatus has four tired wheels 14, and the rotor 10, pickup 12 and waveform shaper 18 are provided for each of the four tired wheels 14. Each of the four pickups 12 is connected to the computer 20 through the appropriate waveform shaper 18.

Figure 3:
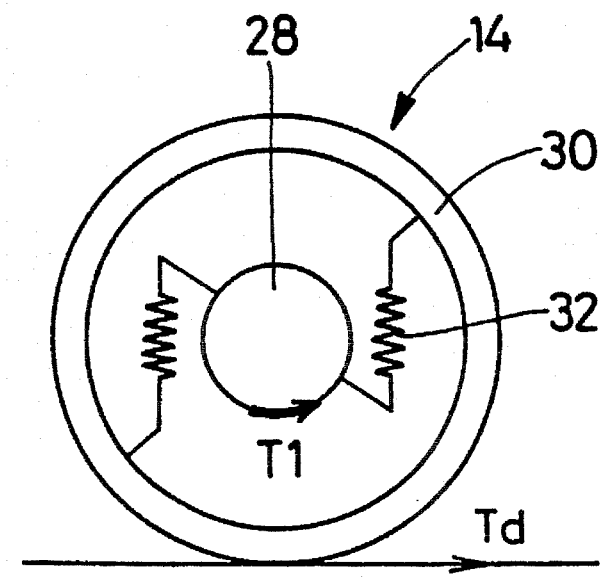
FIG. 3 is a view showing a dynamic model of the tired wheel of FIG. 2.

Each tired wheel 14 consists of a metal wheel member 24, and a tire 26 attached to a rim of the wheel member 24. The tired wheel 14 is dynamically simulated as a system or model as illustrated in FIG. 3, in which a rim 28 and a belt 30 are connected to each other by a torsion spring 32 such that the rim 28 and the belt 30 are rotatable relative to each other. The belt 30 is considered to be the outer surface of the tire 26 at which the tired wheel 14 contacts the road surface. Since the rotor 10 is disposed so as to rotate with the metal wheel member 24, the magnetic pickup 12 is adapted to detect an angular velocity of the rim 28, in a strict sense.

The computer 20 incorporates a CPU 40 as a central processing unit, a ROM 42 in the form of a read-only memory as a first memory device, and a RAM 44 in the form of a random-access memory as a second memory device. The ROM 42 stores control programs for executing the routines illustrated in the flow charts of FIGS. 5 and 6, and cooperates with the CPU 40 and RAM 44 to constitute a rim speed calculator/compensator 45 indicated in the schematic block diagram of FIG. 4.

The computer 20 is connected to another computer 47, which incorporates a CPU 48 as a central processing unit, a ROM 49 in the form of a read-only memory as the first memory device, a RAM 50 in the form of a random-access memory as the second memory device, and an input/output port 51 as an input/output device. The ROM 49 stores various control programs for executing routines such as correlation calculating routines as illustrated in the flow charts of FIGS. 10–12, and cooperate with the CPU 48 and RAM 50 to constitute a disturbance observer 52, a preprocessor 54, a correlation calculator 56, a normalizer 58, a constant compensator 60, a judging processor 62 and a wheel speed generator 64, as indicated in the block diagram of FIG. 4.

To the input/output port 51 of the computer 47, there is connected a display device 66 which provides information indicative of a result of judgement or determination made by the judging processor 62, which would aid an operator of the vehicle in recognizing the condition of each tired wheel 14. While the display device 66 is a liquid crystal display in the present embodiment, the liquid crystal display device 66 may be replaced by any other suitable indicator or display such as an indicator light device operated in a predetermined manner, for instance, in a flickering manner, and a voice indicator which speaks to the vehicle operator.

Also connected to the input/output port 51 is a torque detector 68 adapted to detect a driving torque or a braking torque of the wheel member 24 (rim 28). For example, the torque detector 68 may include a strain gage fixed to the axle of the wheel member 24.

Figure 4:
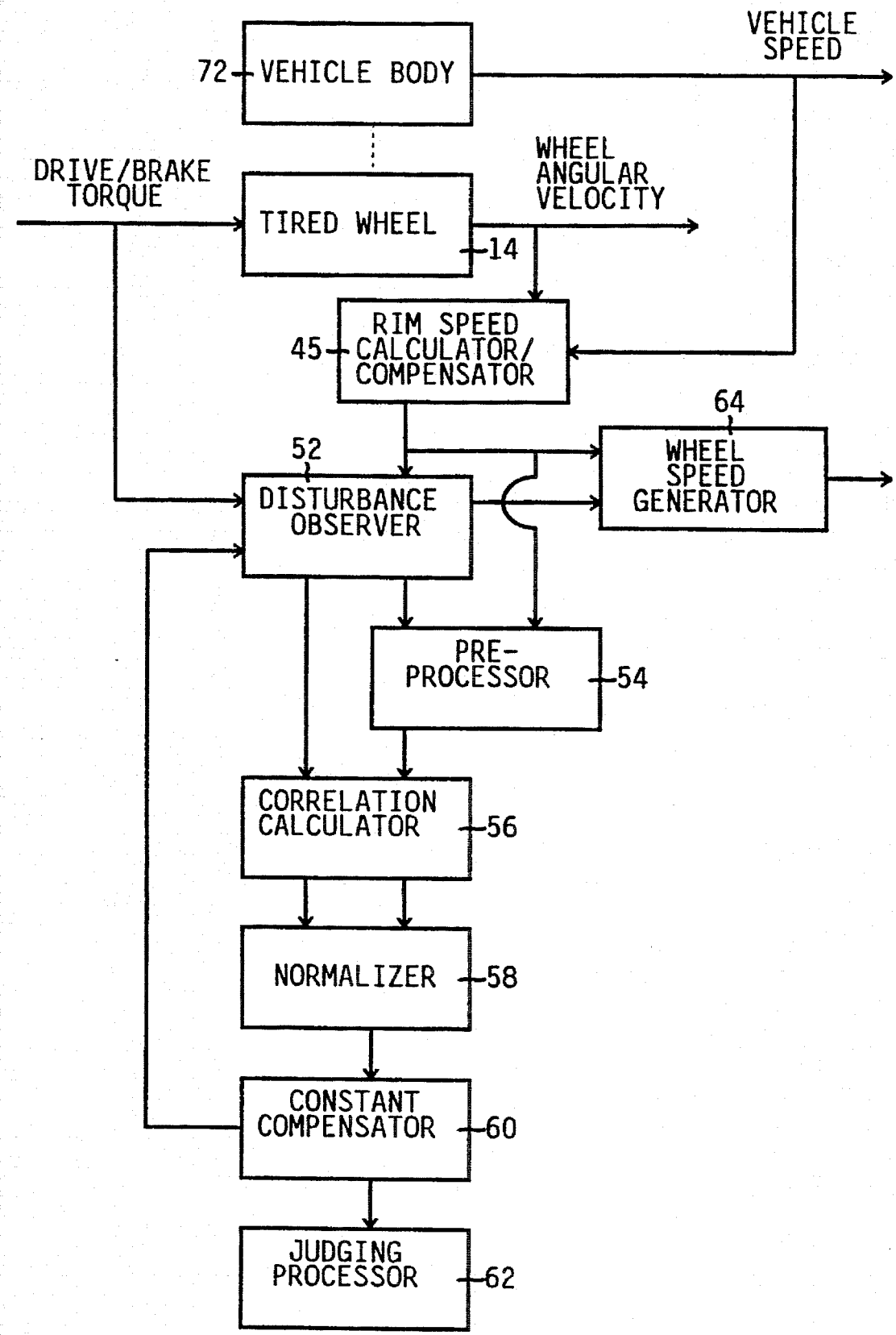
FIG. 4 is a block diagram illustrating the functional elements of the apparatus of FIG. 1.

The rim speed calculator/compensator 45 operates to calculate the rotating speed of each of the four tired wheels 14, on the basis of the signals received from the corresponding magnetic pickups 12 through the respective waveform shapers 18. The calculator/compensator 45 is further adapted to adjust the calculated speed of each tired wheel 14, on the basis of the vehicle running speed (speed of a body 72 of the vehicle as indicated in FIG. 4) detected by a suitable vehicle speed sensor 70 as indicated in FIG. 1. The vehicle speed sensor 70 may be a Doppler-effect ground-speed sensor. The adjustment of the speed of the tired wheel 14 as calculated by the magnetic pickup 12 is effected to compensate the calculated speed for a periodic or cyclic variation of the wheel speed which would arise from inherent deviations of the specifications of the tired wheel 14 and rotor 10 from the nominal values due to errors during manufacture and assembling thereof.

The rotating speed of the tired wheel 14 is obtained or expressed as the peripheral speed of the tire 26, which is calculated from an angular velocity of the wheel 14 represented by the output signal of the magnetic pickup 12. To this end, the radius of the tire 26 (i.e., the distance from the road surface to the axis or center of the wheel 14) should be known. In this respect, the radius of the tire 26 varies with the amount of deformation of the tire due to a load acting thereon, which in turn varies with the air pressure in the tire 26. As long as the air pressure of the tire 26 remains at the nominal or desired level, the nominal radius of the tire 26 is used to calculate the peripheral speed of the tired wheel 14 as the rotating speed. If a change of the air pressure larger than a predetermined limit is found in an appropriate routine as described later, the radius of the tire 26 used to calculate the peripheral speed is determined according to a predetermined relationship (stored in the ROM 42) between the tire radius and the amount of change of the air pressure of the tire.

Figure 6:
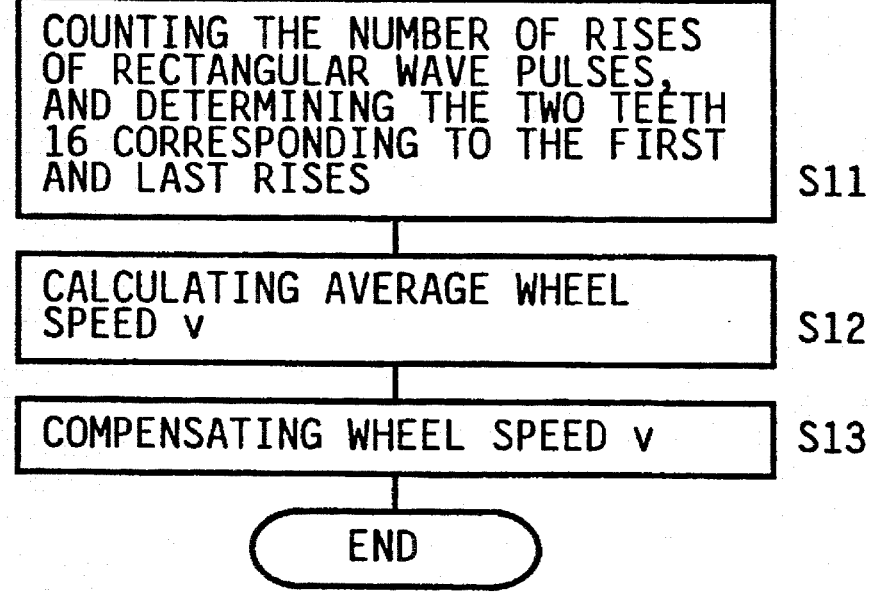
FIG. 6 is a flow chart illustrating a wheel speed calculating/compensating routine according to another control program also stored in the read-only memory.

The rim speed calculator/compensator 45 is adapted to execute a routine of FIG. 5 for obtaining the periodic wheel speed variation and a routine of FIG. 6 for calculating and compensating the detected wheel speed.

The wheel speed variation obtaining routine of FIG. 5 is executed at least once after the rotor 10 and the wheel 14 have been assembled on the vehicle. An operation to obtain the wheel speed variation according to this routine may be performed by a manufacturer of the vehicle, a service engineer of a repair shop, or a user of the vehicle. Where the wheel speed variation is obtained by the user, the routine is executed each time a predetermined condition is satisfied, for example, each time the cumulative running distance or time of the vehicle reaches a predetermined value. In any case, it is desirable to execute the routine while the vehicle is running in a stable mode at a substantially constant speed within a predetermined range, without acceleration or deceleration (braking).

The wheel speed variation obtaining routine of FIG. 5 will be first described. The routine is started with step S1 in which values "n", "i", "V" and "$v_n$" are initialized. Step S1 is followed by step S2 to calculate the vehicle speed V on the basis of the output of the vehicle speed sensor 70. Then, the control flow goes to step S3 to calculate the speed $v_n$ of the tired wheel 14 (hereinafter referred to as "wheel speed $v_n$"). In a strict sense, the wheel speed $v_n$ calculated is the peripheral speed of the belt 30 (peripheral speed of the tire 26 at its outer circumference contacting the road surface), assuming that an angular velocity $\omega_B$ of the belt 30 is the same as an angular velocity $\omega_R$ of the rim 28. For easier understanding, it is assumed that the wheel speed $v_n$ is calculated when each one of the teeth 16 passes the sensing head of the magnetic pickup 12. More specifically described, the wheel speed $v_n$ corresponding to each of the teeth 16 of the rotor 10 is calculated, on the basis of a time interval between the rises or falls of the adjacent two rectangular pulses obtained from the waveform shaper 18, or a time interval between midpoints between the rise and fall of the adjacent pulses.

However, the relation between the time required for each tooth 16 to pass the pickup 12 and the time required to calculate the wheel speed $v_n$ should be taken into account. In this respect, the routine of FIG. 5 may be modified such that the wheel speed $v_n$ is calculated each time two or more teeth 16 pass the pickup 12.

Step S3 is followed by step S4 to calculate a difference $(V-v_n)$ of the calculated wheel speed $v_n$ from the vehicle speed V determined in step S2. The calculated speed difference $(V-v_n)$ is considered a variation of the wheel speed $v_n$ (hereinafter referred to as "wheel speed variation $(V-v_n)$"). The thus obtained wheel speed variation $(V-v_n)$ is stored at the appropriate one of the successive addresses of a "wheel speed variation" memory of the RAM 44 whose number is equal to "j" (number of the wheel speed values $v_n$ obtained during one revolution of the rotor 10 or wheel 14). In the present embodiment wherein the wheel speed $v_n$ is obtained for each one of the teeth 16, the number "j" or the number of the addresses of the "wheel 16. The address at which the wheel speed variation $(V-v_n)$ speed variation" memory is equal to the number of the teeth is stored corresponds to the current number "n". It is also noted that the content at each address represents a cumulative wheel speed variation $\Sigma(V-v_n)=(((V-v_n)$ at i=1)+((V-v_n) at i=2)+ ... ).

Step S4 is followed by step S5 in which the integer "n" is incremented to repeat steps S3 and S4 if an affirmative decision (YES) is obtained in the following step S6, that is, if the incremented integer "n" is smaller than or equal to "j". If a negative decision (NO) is obtained in step S6, this means that the tired wheel 14 has rotated one full revolution, and that the wheel speed values $v_n$ corresponding to all the teeth 16 have been obtained. With the negative decision (NO) obtained in step S6, the control flow goes to step S7 to reset the integer "n" to "1" and increment an integer "i". Then, step S8 is implemented to determine whether the integer "i" is smaller than or equal to "N". If an affirmative decision (YES) is obtained in step S8, the control flow goes back to step S2 to determine again the vehicle speed V, and repeatedly implement steps S3 and S4 for obtaining the cumulative wheel speed variations corresponding to all the teeth 16 during the next one revolution of the tired wheel 14. The wheel speed variation $(V-v_n)$ obtained by each implementation of step S4 is added to the content of the address of the "wheel speed variation" memory which corresponds to the integer "n". Thus, the content (representative of the cumulative wheel speed variation) of each address of the memory is increased each time the tired wheel 14 is rotated by one revolution.

In the illustrated embodiment, the vehicle speed V is not updated each time the integer "n" is incremented or each time steps S3 and S4 are repeated, on the assumption that the vehicle speed does not change during one full revolution of the wheel 14. However, the routine of FIG. 5 may be modified such that the control flow goes back to step S2 each time the affirmative decision (YES) is obtained in step S6, namely, each time the wheel speed variation $(V-v_n)$ corresponding to each tooth 16 is obtained.

A negative decision (NO) is obtained in step S8 when the integer "i" has become larger than the predetermined number "N", namely, when the tired wheel 14 has rotated the predetermined number "N" of revolution. In this case, step S9 is implemented to divide the content (cumulative wheel speed variation) of each address of the "wheel speed variation" memory of the RAM 44, by the number "N", to thereby obtain an average cumulative wheel speed variation $\Delta v_n$. This value $\Delta v_n$ is an average cumulative variation of the wheel speed $v_n$ at each of the teeth 16 of the rotor 10, with respect to a reference position of the rotor 10, which is the position of the tooth 16 at which the routine of FIG. 5 is initiated or at which steps S3 and S4 are implemented for the first time. Where the routine of FIG. 5 is executed from time to time or continuously during running of the vehicle, the wheel speed calculating/compensating routine of FIG. 6 does not require the reference position of the rotor 10 (wheel 14) to compensate the wheel speed for the wheel speed variation. Where the routine of FIG. 5 is executed only once immediately after the assembling of the tired wheel 14 or each time a power-on switch of the vehicle has been turned on, the reference position of the rotor 10 should be known. To this end, a suitable marking indicative of the reference position is provided on the rotor 10, and a detector for sensing the marking is fixedly disposed, to detect the reference position.

Where the marking indicative of the reference position of the rotor 10 is provided, the routine of FIG. 5 to obtain the values of the average wheel speed variation $\Delta v_n$ corresponding to the individual teeth 16 may be executed beginning with the tooth 16 at the reference position. Alternatively, the routine may be initiated at a desired position of the rotor 10, and the obtained values $\Delta v_n$ are converted to those with respect to the reference position.

The number "N" of revolutions of the rotor 10 (wheel 14) for which the average cumulative wheel speed variation values $\Delta v_n$ are obtained should be large enough to minimize an influence of the road surface condition on the obtained values $\Delta v_n$. In the present invention, the number "N" is determined depending upon the vehicle speed V, more specifically, the number "N" is determined so as to increase with the vehicle speed V, as indicated in the graph of FIG. 7.

In step S9, the obtained average cumulative wheel speed variation $\Delta v_n$ for each tooth 16 is divided by the vehicle speed V, to obtain a cumulative wheel speed variation rate $\Delta v_n/V$. The obtained rate $\Delta v_n/V$ for each tooth 16 is stored at an appropriate address of a "wheel speed variation rate" memory of the RAM 44. The values of this rate $\Delta v_n/V$ corresponding to the teeth 16 represent a rotating speed variation inherent to the specific wheel 14, which arises from manufacturing and assembling errors of the rotor 10 and wheel 14. These values $\Delta v_n/V$ are used in the routine of FIG. 6 to compensate or adjust the detected speed v of the wheel 14.

The wheel speed calculating/compensating routine of FIG. 6 is executed successively during running of the vehicle. In the present embodiment, the routine is executed to calculate the wheel speed from an average time duration between predetermined rises of the rectangular pulses generated from the waveform shaper 18 during a predetermined sampling time.

The routine of FIG. 6 is initiated with step S11 to detect the first and last rises of the rectangular pulses during the sampling time, count the number of the rises during the sampling time, and determine the two teeth 16 of the rotor 10 which correspond to the detected first and last rises of the pulses. Described in detail, each time a rectangular pulse rises, an interruption routine is executed to detect the moment of the rise on the basis of an output of a timer incorporated in the computer 20. A counter is provided to count the number of the rises which occur during the sampling time. Another counter is provided to count the number of the rises as counted from the rise corresponding to the reference position of the rotor 10. This counter is reset at the reference position, and the content of the counter identifies the tooth 16 corresponding to the rise of the rectangular pulse generated last.

Then, the control flow goes to step S12 to calculate the average speed v of the wheel 14 during the sampling time, on the basis of an average time interval between the rises of the adjacent rectangular pulses during the sampling time.

Step S12 is followed by step S13 to compensate or adjust the wheel speed v, on the basis of the wheel speed variation rates $\Delta v_{n1}/V$ and $\Delta v_{n2}/V$ corresponding to the two teeth 16 which correspond to the first and last rises of the rectangular pulses. These variation rates are read from the "wheel speed variation rate" memory of the RAM 44, on the basis of the two teeth 16 determined in step S11. The compensation of the wheel speed v is effected according to the following equation (1):

$$v = (1 + (\Delta v_{n1} - \Delta v_{n2})/2V)v_0 \tag{1}$$

It will be understood from the above equation (1) that the wheel speed v is compensated by an amount equal to ½ of a difference between the rates $\Delta v_{n1}/V$ and $\Delta v_{n2}/V$ multiplied by the pre-compensated value $v_0$.

The compensated wheel speed v obtained in step S13 of the routine of FIG. 6 is used by the disturbance observer 52 and the wheel speed generator 64. However, the disturbance observer 52 uses an angular velocity corresponding to the wheel speed v. To this end, the compensated wheel speed v obtained in step S13 is converted into the angular velocity $\omega R$ of the rim 28, with the radius R of the tire 26 taken into account. The calculated angular velocity $\omega R$ is stored in an "angular velocity" memory of the RAM 44.

The disturbance observer 52 is arranged according to the dynamic model of the tired wheel 14 as illustrated in FIG. 3. There will be described the arrangement of the disturbance observer 52.

If the tired wheel 14 is simulated as the dynamic model of FIG. 3 wherein the rim 28 and the belt 30 having the respective moments of inertia $J_R$ and $J_B$ are connected by the torsion spring 32 having the spring constant K, the following equations of state (2), (3) and (4) are established so as to define a linear dynamical system:

$$J_R \omega_R' = -K\theta_{RB} + T_1 \tag{2}$$

$$J_B \omega_B' = K\theta_{RB} - T_d \tag{3}$$

$$\theta_{RB}' = \omega_R - \omega_B \tag{4}$$

where, $\omega_R$: angular velocity of the rim 28, $\omega_R'$: angular acceleration of the rim 28, $\omega_B$: angular velocity of the belt 30, $\omega_B'$: angular acceleration of the belt 30, $\theta_{RB}$: torsion angle between the rim 28 and the belt 30, $T_1$: driving or braking torque detected by the torque detector 68, $T_d$: disturbance torque (which is derived from rolling resistances of the wheel 14 which irregularly or regularly occur due to steps or undulation on the road surface, respectively).

Actually, however, a damper is present between the rim 28 and the belt 30. Since the influence of the damper is relatively small, the presence of the damper is ignored in the above equations according to the present embodiment. The effect of the damper is taken into consideration in another embodiment of the invention described later.

The above state equations (2) through (4) may be converted into the following equation (5) using vectors and matrices:

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ -1/J_B \\ 0 \end{bmatrix} T_d \tag{5}$$

The motion of the tired wheel 14 when the spring constant K of the torsion spring 32 is changed from K to K+$\Delta$K due to a change in the air pressure of the tire 26 is expressed by the following equation (6):

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ -1/J_B \\ 0 \end{bmatrix} T_d + \begin{bmatrix} -\Delta K/J_R \\ \Delta K/J_B \\ 0 \end{bmatrix} \theta_{RB} \tag{6}$$

The amount of change $\Delta K$ of the spring constant K is equivalent to the amount of a disturbance acting on the tire 26 in the normal condition, which disturbance is expressed by the last term of the right member of the above equation (6). It will be understood that the last term of the right member of the equation (6) includes the amount of change $\Delta K$, which varies with a change in the air pressure of the tire 26. In other words, the amount of change in the air pressure of the tire 26 can be estimated by estimating the disturbance as expressed by the last term of the right member of the equation (6). The disturbance observer 52 should be adapted to estimate an overall disturbance w which includes the disturbance torque $T_d$ (due to a change of the road surface condition) of the wheel 14 as well as the disturbance due to the change in the air pressure of the tire 26. The overall disturbance w is represented by the following equation (7):

$$[w] = \begin{bmatrix} 0 \\ -1/J_B \\ 0 \end{bmatrix} T_d + \begin{bmatrix} -\Delta K/J_R \\ \Delta K/J_B \\ 0 \end{bmatrix} \theta_{RB} \quad (7)$$

Theoretically, however, only one of the three elements of the disturbance w can be estimated by the observer 52. Therefore, only the second element $w_2$ is estimated according to the following equation (8), and the motion state of the tired wheel 14 is expressed by the following equation of state (9):

$$w_2 = (-1/J_B) T_d + (\Delta K/J_B)\theta_{RB} \quad (8)$$

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ 1 \\ 0 \end{bmatrix} w_2 \quad (9)$$

Thus, the disturbance observer 52 operates according to the above equation (9), to estimate the disturbance as one of variables which reflect the state of the system. To use the disturbance $w_2$ of the equation (8) as one of the variables, the following equation (10) is used to approximate the disturbance to be estimated:

$$w_2' = 0 \quad (10)$$

The approximation according to the above equation (10) means approximation (zeroth order approximation) of a continuously varying disturbance by successive values which change in steps as indicated in the graph of FIG. 8. This approximation is sufficiently acceptable if the disturbance estimating speed of the disturbance observer 52 is high enough to follow the changing rate or velocity of the disturbance to be estimated. The following equation (11) represents an expanded system which includes the disturbance $w_2$ as one of the system variables according to the equation (10):

$$\begin{bmatrix} \omega_R' \\ \omega_B' \\ \theta_{RB}' \\ w_2' \end{bmatrix} = \begin{bmatrix} 0 & 0 & -K/J_R & 0 \\ 0 & 0 & K/J_B & 1 \\ 1 & -1 & 0 & 0 \\ 0 & 0 & 0 & 0 \end{bmatrix} \begin{bmatrix} \omega_R \\ \omega_B \\ \theta_{RB} \\ w_2 \end{bmatrix} + \begin{bmatrix} 1/J_R \\ 0 \\ 0 \\ 0 \end{bmatrix} T_1 \quad (11)$$

In the above equation (11), $[\omega_B \; \theta_{RB} \; w_2]^T$ cannot be detected. In the system using the disturbance observer 52, not only the disturbance $w_2$ but also the variables $\omega_B$ and $\theta_{RB}$ that cannot be measured can be estimated. For simplification, the above equation (11) is broken down into the following vectors and matrices:

| | | |
|---|---|---|
| $[X_a]$ | = | $\omega_R$ |
| $[X_b]$ | = | $[\omega_b \; \theta_{RB} \; w_2]^T$ |
| $[u]$ | = | $T_1$ |
| $[A_{11}]$ | = | 0 |
| $[A_{12}]$ | = | $[0 \; -K/J_R \; 0]$ |
| $[A_{21}]$ | = | $[0 \; 1 \; 0]^T$ |
| $[A_{22}]$ | = | $\begin{bmatrix} 0 & K/J_B & 1 \\ -1 & 0 & 0 \\ 0 & 0 & 0 \end{bmatrix}$ |
| $[B_1]$ | = | $1/J_R$ |
| $[B_2]$ | = | $[0 \; 0 \; 0]^T$ |

The minimum-order observer to estimate the state $[z] = [\omega_B \; \theta_{RB} \; w_2]^T$ is expressed by the following equation (12):

$$[z_p'] = [A_{21}][X_a] + [A_{22}][z_p] + [B_2][u] + \quad (12)$$
$$[G]\{[x_a'] - ([A_{11}][x_a] + [A_{12}][z_p] + [B_1][u])\} =$$
$$([A_{21}] - [G][A_{11}])[x_a] + ([A_{22}] - [G][A_{12}])[z_p] + [G][x_a'] +$$
$$([B_2] - [G][B_1])[u]$$

where, $[z_p]$: estimated value of $[z]$, $[z_p']$: rate of change of the estimated value $[z_p]$, $[G]$: gain which determines the estimating speed of the disturbance observer 52.

Figure 9:
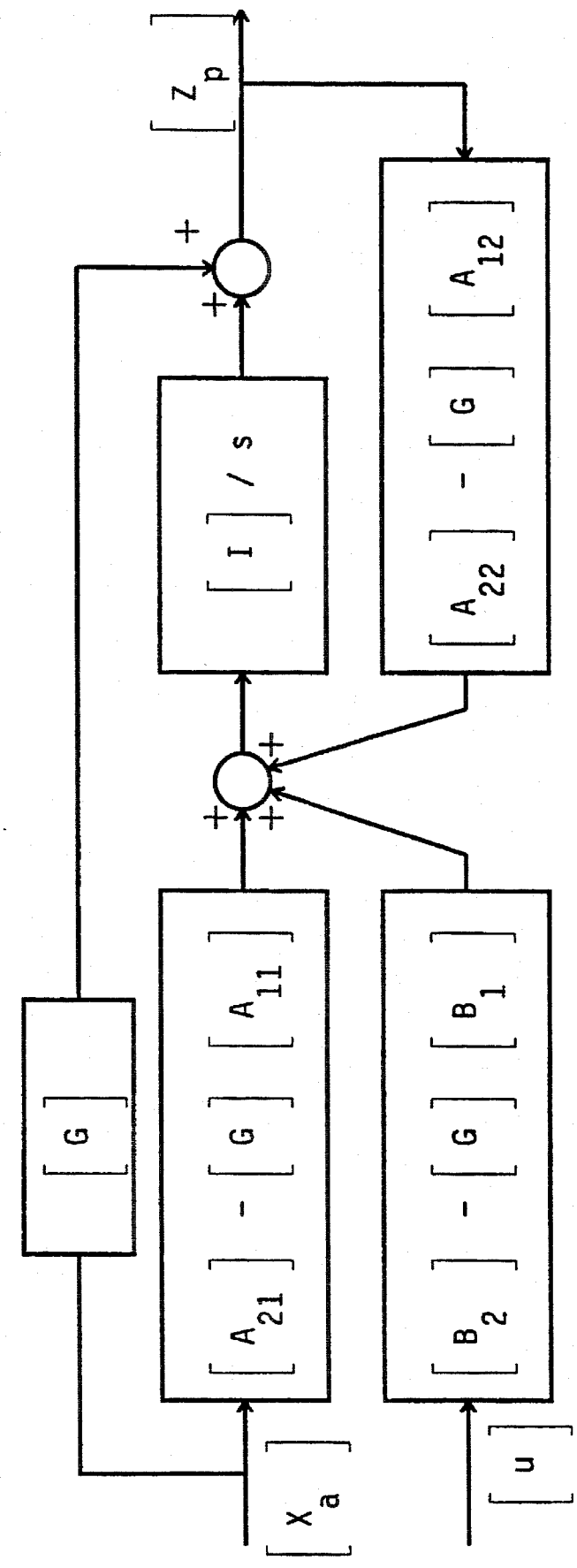
FIG. 9 is a block diagram illustrating a disturbance observer incorporated in the apparatus.

The above equation (12) is expressed by the block diagram of FIG. 9, wherein [I] represents a unit or identity matrix, while "s" represents a Laplace operator.

If an error between the true value $[z]$ and the estimated value $[z_p]$ is expressed as $[e] = [z] - [z_p]$ and if a rate of change of the error $[e]$ is represented by $[e']$, the following equation (13) is obtained:

$$[e'] = ([A_{22}] - [G][A_{12}])[e] \quad (13)$$

The above equation (13) indicates the estimating characteristic of the disturbance observer 52, and the eigen values of the matrix $([A_{22}] - [G][A_{12}])$ are the pole of the disturbance observer 52. Accordingly, the estimating speed of the disturbance observer 52 increases as the eigen values deviate from the origin in the left half of the plane s. The observer gain $[G]$ is suitably determined depending upon a desired value of the estimating speed of the disturbance observer 52.

There has been described one aspect of the disturbance observer 52, namely, the estimation of the disturbance $w_2$ due to the amount of change $\Delta K$ of the spring constant K of the torsion spring 32, assuming the disturbance $w_2$ is represented by the above equation (8), that is, $w_2 = (-1/J_B)T_d + (\Delta K/J_B)\theta_{RB}$. The disturbances which would occur due to changes of the moments of inertia $J_B$, $J_R$ of the belt 30 and rim 28 to $(J_B + \Delta J_B)$ and $(J_R + \Delta J_R)$, respectively, may be estimated in manners similar to that explained above with respect to the disturbance $w_2$.

There will next be described the manner of estimating the disturbance due to the change $\Delta J_B$ of the moment of inertia $J_B$ of the belt 30.

The motion of the tired wheel 14 when the moment of inertia $J_B$ has changed by $\Delta J_B$ is expressed by the following equation (14):

$$\begin{bmatrix} \omega_R' \\ \omega_B' \\ \theta_{RB}' \end{bmatrix} = \qquad (14)$$

$$\begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} +$$

$$\begin{bmatrix} 1/J_R \\ 0 \\ 0 \end{bmatrix} T_1 + \begin{bmatrix} -T_d/J_B & 0/0 & (\Delta J_B/J_B)\omega_B' \end{bmatrix}$$

The disturbance to be estimated is the second element of the last term of the right member of the above equation (14). If the disturbance $w_2$ is defined by the following equation (15), an expanded system as represented by the above equation (11) is obtained from the following equation of state (16):

$$w_2 = (-1/J_B) T_d - (\Delta J_B/J_B)\omega_B' \qquad (15)$$

$$\begin{bmatrix} \omega_R' \\ \omega_B' \\ \theta_{RB}' \end{bmatrix} = \qquad (16)$$

$$\begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ 1 \\ 0 \end{bmatrix} w_2$$

Thus, the disturbance observer 52 operates to estimate the disturbance due to the change $\Delta J_B$ of the moment of inertia $J_B$ of the belt 30.

Then, the manner of estimating the disturbance due to the change $\Delta J_R$ of the moment of inertia $J_R$ of the rim 28 will be explained. Normally, the moment of inertia $J_R$ of the rim 28 will not change. If the currently used metal wheel member 24 is replaced by a new one, the moment of inertia $J_R$ changes from one value to another. If the same moment of inertia $J_R$ were used even after the new wheel member 24 is used, there would be an error in the estimation of the overall disturbance acting on the tired wheel 14. In the present embodiment, therefore, the disturbance observer 52 is arranged to also estimate the disturbance due to a change of the moment of inertia $J_R$ of the rim 28.

The motion of the tired wheel 14 when the moment of inertia $J_R$ has changed by $\Delta J_R$ is expressed by the following equation (17):

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \qquad (17)$$

$$\begin{bmatrix} -(\Delta J_R/J_R)\omega_R' \\ -T_d/J_B \\ 0 \end{bmatrix}$$

The disturbance to be estimated is the first element of the last term of the right member of the above equation (17). If the disturbance $w_1$ is defined by the following equation (18), an expanded system as represented by the following equation (20) is obtained from the following equation of state (19):

$$w_1 = -(\Delta J_R/J_R)\omega_R' \qquad (18)$$

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 1 \\ 0 \\ 0 \end{bmatrix} W_1 \qquad (19)$$

$$\begin{bmatrix} \omega_R' \\ \omega_B' \\ \theta_{RB}' \\ W_1' \end{bmatrix} = \begin{bmatrix} 0 & 0 & -K/J_R & 0 \\ 0 & 0 & K/J_B & 1 \\ 1 & -1 & 0 & 0 \\ 0 & 0 & 0 & 0 \end{bmatrix} \begin{bmatrix} \omega_R \\ \omega_B \\ \theta_{RB} \\ W_1 \end{bmatrix} + \begin{bmatrix} 1/J_R \\ 0 \\ 0 \\ 0 \end{bmatrix} T_1 \qquad (20)$$

Thus, the disturbance observer 52 operates to estimate the disturbance due to the change $\Delta J_R$ of the moment of inertia $J_R$ of the rim 28.

The disturbance observer 52 arranged as described above receives as an input the angular velocity $\omega_R$ which is calculated from the wheel speed v and the tire radius R by the rim speed calculator/compensator 45 as described above. On the basis of the angular velocity $\omega_R$, the observer 52 estimates the disturbance $w_2$ as expressed by the above equation (8) due to the amount of change $\Delta K$ of the spring constant K of the torsion spring 32, the disturbance $w_2$ as expressed by the above equation (15) due to the amount of change $\Delta J_B$ of the moment of inertia $J_B$ of the belt 30, and the disturbance $w_1$ as expressed by the above equation (18) due to the amount of change $\Delta J_R$ of the moment of inertia $J_R$ of the rim 28. These disturbances $w_2$ and $w_1$ are obtained as estimated disturbance values $w_{2p}$, $w_{2p}$ and $w_{1p}$, respectively. In addition to these values $w_{2p}$, $w_{2p}$ and $w_{1p}$, the observer 52 is adapted to obtain an estimated value $\omega_{Bp}$ of the angular velocity $\omega_B$ of the belt 30 and an estimated value $\theta_{RBp}$ of the torsion angle $\theta_{RB}$ between the rim 28 and the belt 30, which $\omega_B$ and $\theta_{RB}$ cannot be detected or measured.

The pre-processor 54 operates to perform a preliminary processing operation necessary for the correlation calculator 56 to operate. That is, the pre-processor 54 is adapted to calculate an angular acceleration $\omega R'$ of the rim 28 and an estimated value $\omega_{Bp}'$ of the angular acceleration $\omega_B'$, on the basis of the detected angular velocity $\omega R$ of the rim 28 and the estimated angular velocity $\omega_{Bp}$ of the belt 30 obtained by the disturbance observer 52.

The correlation calculator 56 perform operations to calculate correlation functions, on the basis of the estimated disturbance values $w_{2p}$, $w_{2p}$, $w_{1p}$, angular velocity values $\omega_R$, $\omega_{Bp}$, angular acceleration values $\omega_R'$, $\omega_{Bp}'$ and torsion angle $\theta_{RBp}$. Using the calculated correlation functions, the normalizer 58 performs a normalizing operation and calculates the amounts of change of the spring constant K of the torsion spring 32, moment of inertia $J_R$ of the rim 28 and moment of inertia $J_B$ of the belt 30.

There will first be described the manner of obtaining the amount of change of the spring constant K of the torsion spring 32.

Figure 10:
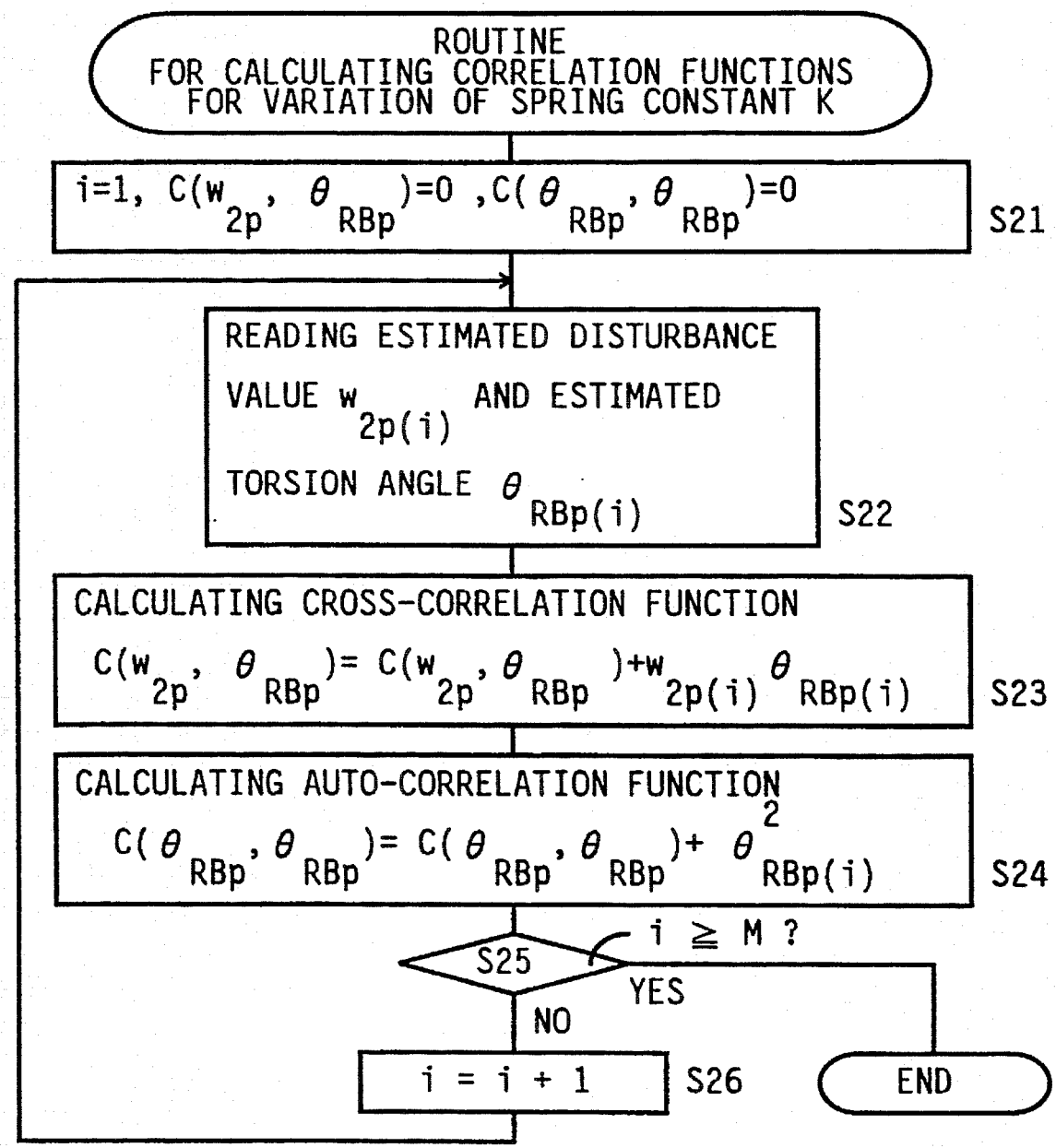
FIG. 10 is a flow chart illustrating a routine for calculating a correlation for obtaining a spring constant variation of the tired wheel, according to a further control program stored in the read-only memory.

The correlation calculator 56 is adapted to execute a routine of the flow chart of FIG. 10 for calculating correlation functions for obtaining the amount of change of the spring constant K.

The routine of FIG. 10 is initiated with step S21 to reset the integer "i" to "1", and reset correlation functions $C(w_{2p}, \theta_{RBp})$ and $C(\theta_{RBp}, \theta_{RBp})$ to "0". The correlation function $C(w_{2p}, \theta_{RBp})$ is a function of cross-correlation between the estimated value $w_{2p}$ of the disturbance $w_2$ expressed by the above equation (8) and the estimated torsion angle value $\theta_{RBp}$, while the function $C(\theta_{RBp}, \theta_{RBp})$ is a function of auto-correlation of the estimated torsion angle value $\theta_{RBp}$. In other words, the contents of "cross-correlation" and "auto-correlation" memories of the RAM 50 are cleared in step S21.

Step S22 is then implemented to read the present estimated disturbance value $w_{2p(i)}$ and the present estimated torsion angle value $\theta_{RBp(i)}$. Step S22 is followed by step S23 to calculate a product of the estimated disturbance value $w_{2p(i)}$ and the estimated torsion angle value $\theta_{RBp(i)}$, and add the product to the last value of the cross-correlation function $C(w_{2p}, \theta_{RBp})$ to thereby update the cross-correlation function $C(w_{2p}, \theta_{RBp})$. In the first cycle of execution of the routine of FIG. 10, the last value of the cross-correlation function $C(w_{2p}, \theta_{RBp})$ is zero, and the above-indicated product $w_{2p(i)} \times \theta_{RBp(i)}$ is stored in the "cross-correlation" memory.

The control flow then goes to step S24 to obtain the square of the estimated torsion angle value $\theta_{RBp(i)}$, and add the obtained square to the last value of the auto-correlation function $C(\theta_{RBp}, \theta_{RBp})$ to thereby update the auto-correlation function $C(\theta_{RBp}, \theta_{RBp})$. The updated value is stored in the "auto-correlation" memory.

Step S25 is then implemented to determine whether the integer "i" has become equal to or larger than a predetermined integer value "M" or not. Initially, a negative decision (NO) is obtained in step S25, and step S26 is implemented to increment the integer "i", to repeat steps S22, S23 and S24.

An affirmative decision (YES) is obtained in step S25 when steps S22–S24 have been repeated the predetermined number of times "M". Thus, one cycle of execution of the routine of FIG. 10 is terminated.

After the cross-correlation function $C(w_{2p}, \theta_{RBp})$ and the auto-correlation function $C(\theta_{RBp}, \theta_{RBp})$ have been obtained by the correlation calculator 56, the normalizer 58 obtains a normalized value $L_K$ according to the following equation (21), and the obtained normalized value $L_K$ is stored in an $L_K$ memory of the RAM 50.

$$L_K = C(w_{2p}, \theta_{RBp})/C(\theta_{RBp}, \theta_{RBp}) \tag{21}$$

The value $L_K$ obtained according to the above equation (21) may be expressed by the following equation (22), on the basis of the above equation (8):

$$L_K = (-1/J_B)C_0 + \Delta K/J_B \tag{22}$$

Since the value $C_0$ is represented by $C(T_{dp}, \theta_{RBp})/C(\theta_{RBp}, \theta_{RBp})$ and is independent of a change of the spring constant K, the value $C_0$ may be obtained when the air pressure of the tire 26 is normal. It is noted that the value $C(T_{dp}, \theta_{RBp})$ is a function of cross-correlation between the estimated value $T_{dp}$ of the disturbance torque $T_d$ and the estimated value $\theta_{RBp}$ of the torsion angle $\theta_{RB}$.

Similar routines are executed for obtaining the changes of the moments of inertia $J_R$, $J_B$ of the rim 28 and the belt 30.

Figure 11:
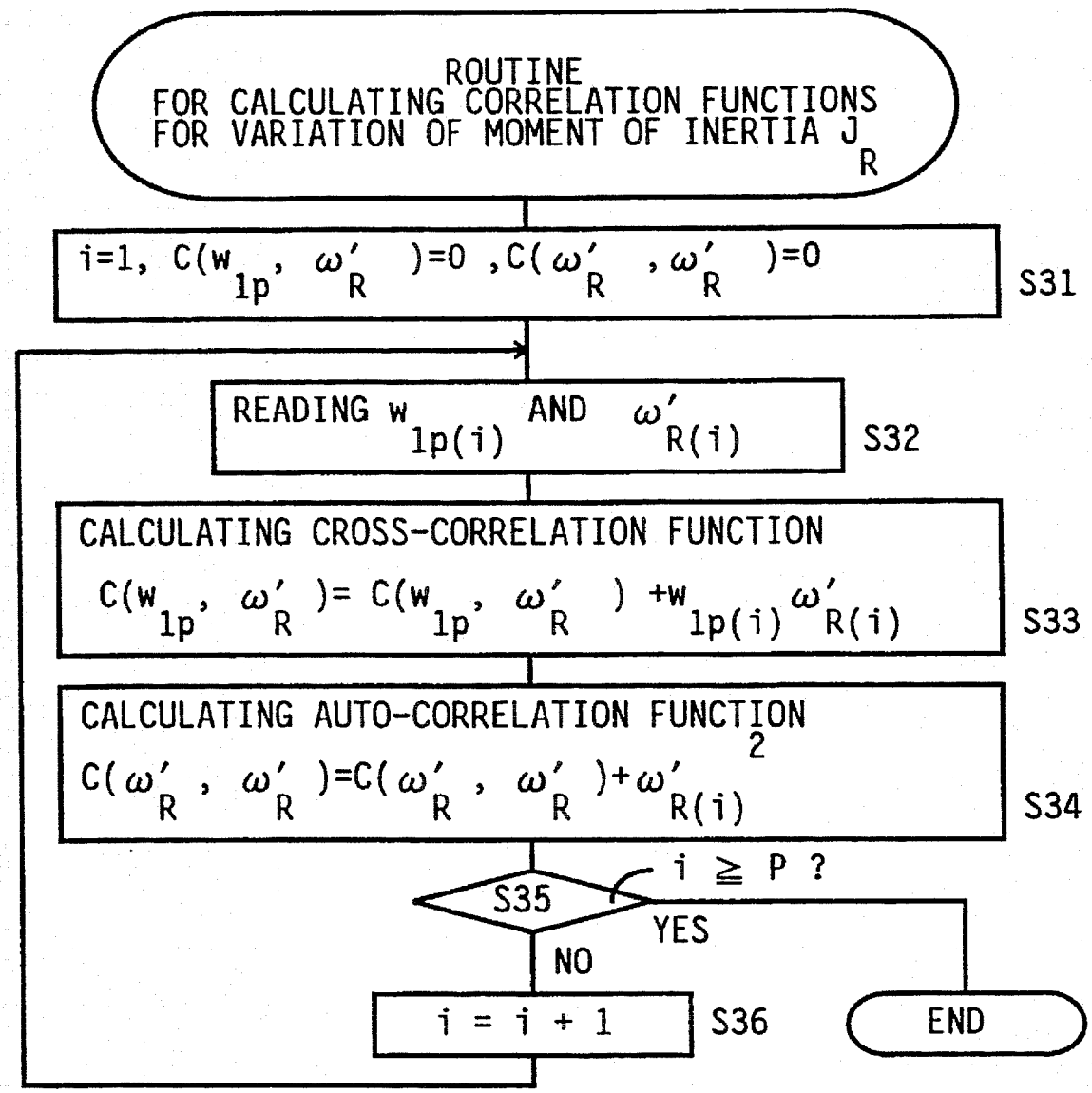
FIG. 11 is a flow chart illustrating a routine for calculating a correlation for obtaining a moment of inertia variation of the tired wheel, according to a still further control program stored in the read-only memory.

A routine illustrated in the flow chart of FIG. 11 is formulated to calculate correlation functions for obtaining the amount of change of the moment of inertia $J_R$ of the rim 28. More specifically, a cross-correlation function $C(w_{1p}, \omega_R')$ and an auto-correlation function $C(\omega_R', \omega_R')$ are obtained from the estimated value $w_{1p}$ of the disturbance $w_1$ expressed by the above equation (18) and the angular acceleration $\omega_R'$ of the rim 28 A normalized value $L_{JR}$ is calculated by the following equation (23) by the normalizer 58, and the calculated normalized value $L_{JR}$ is stored in an $L_{JR}$ memory of the RAM 50:

$$L_{JR} = C(w_{1p}, \omega_R')/C(\omega_R', \omega_R') \tag{23}$$

The value $L_{JR}$ obtained according to the above equation (23) may be expressed by the following equation (24), on the basis of the above equation (18):

$$L_{JR} = -\Delta J_R/J_R \tag{24}$$

Figure 12:
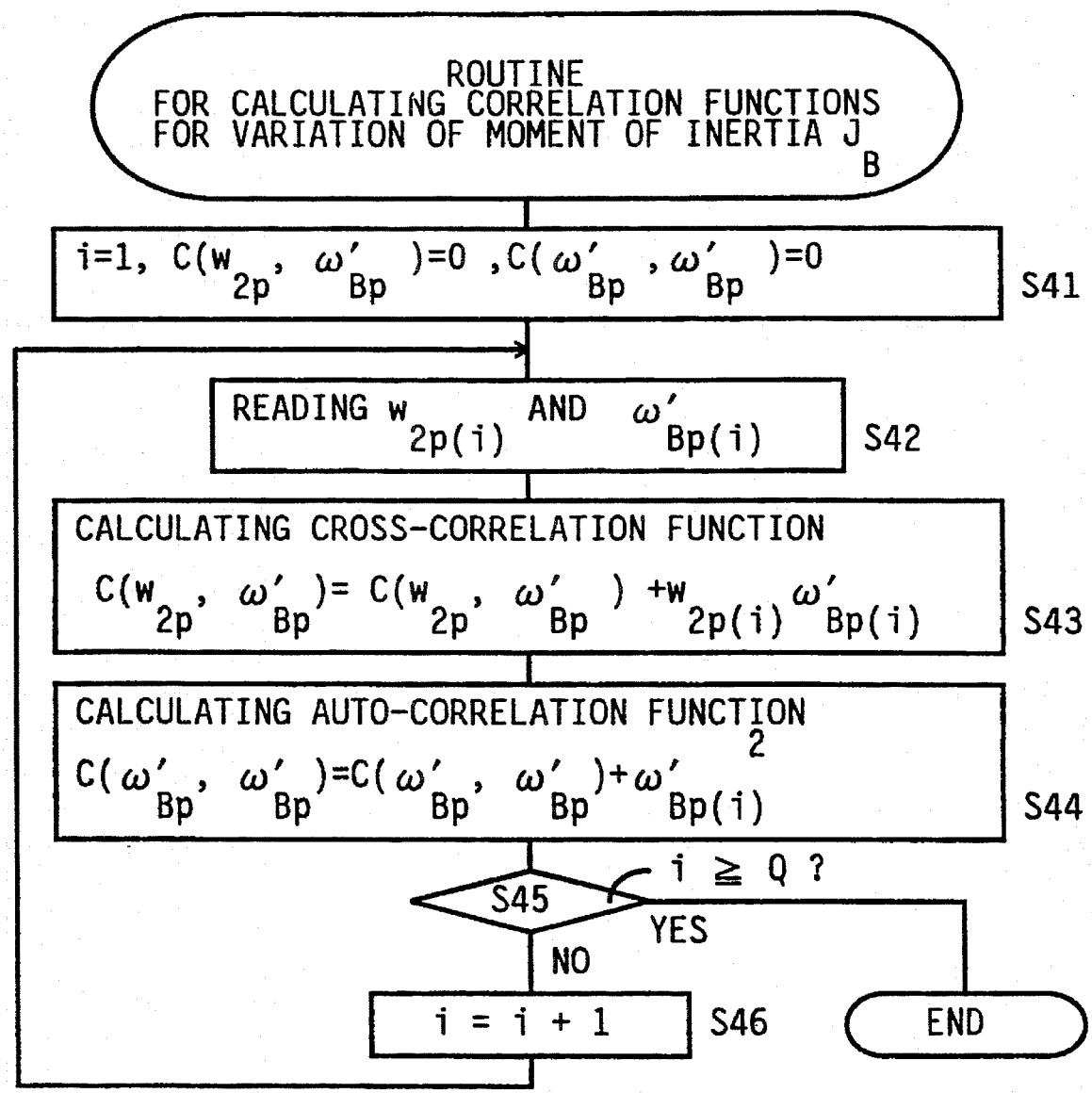
FIG. 12 is a flow chart illustrating a routine for calculating a correlation for obtaining another moment of inertia variation of the tired wheel, according to a yet further control program stored in the read-only memory.

A routine illustrated in the flow chart of FIG. 12 is formulated to calculate correlation functions for obtaining the amount of change of the moment of inertia $J_B$ of the belt 30. More specifically, a cross-correlation function $C(w_{2p}, \omega_{Bp}')$ and an auto-correlation function $C(\omega_{Bp}', \omega_{Bp}')$ are obtained from the estimated value $w_{2p}$ of the disturbance $w_2$ expressed by the above equation (15) and the estimated angular acceleration $\omega_{Bp}'$ of the belt 30. A normalized value $L_{JB}$ is calculated by the following equation (25) by the normalizer 58, and the calculated normalized value $L_{JB}$ is stored in an $L_{JB}$ memory of the RAM 50:

$$L_{JB} = C(w_{2p}, \omega_{Bp}')/C(\omega_{Bp}', \omega_{Bp}') \tag{25}$$

The value $L_{JB}$ obtained according to the above equation (25) may be expressed by the following equation (26), on the basis of the above equation (15):

$$L_{JB} = (-1/J_B)C_1 - \Delta J_B/J_B \tag{26}$$

The value $C_1$ means $C(T_{dp}, \omega_{Bp}')/C(\omega_{Bp}', \omega_{Bp}')$.

Although the routines of FIGS. 10, 11 and 12 are executed (one cycle at a time for each routine) sequentially one after another in the present embodiment, these routines may be executed in parallel. For instance, with the same value used for the integers "M", "P" and "Q" in steps S25, S35 and S45, the corresponding first steps S21, S31 and S41 of FIGS. 10–12 are sequentially implemented, followed by sequential implementation of the corresponding second steps S22, S32 and S42, and so on.

Then, the constant compensator 60 operates to compensate the spring constant K of the torsion spring 32 and the moments of inertia $J_R$, $J_B$ of the rim 28 and belt 30, on the basis of the values $L_K = C(w_{2p}, \theta_{RBp})/C(\theta_{RBp}, \theta_{RBp})$, $L_{JR} = C(w_{1p}, \omega_R')/C(\omega_R', \omega_R')$ and $L_{JB} = C(w_{2p}, \omega_{Bp}')/C(\omega_{Bp}', \omega_{Bp}')$, which values $L_K$, $L_{JR}$, $L_{JB}$ are stored in the appropriate memories of the RAM 50.

Described in detail, the spring constant K and the moments of inertia $J_R$ and $J_B$ of the disturbance observer 52 are adjusted by the amounts of change $\Delta K$, $\Delta J_R$ and $\Delta J_B$ which are obtained by the constant compensator 60 on the basis of the values $L_K$, $L_{JR}$ and $L_{JB}$ and according to respective predetermined relationships between $L_K$ and $\Delta K$, between $L_{JR}$ and $\Delta J_R$ and between $L_{JB}$ and $\Delta J_B$, since the values $L_K$, $L_{JR}$ and $L_{JB}$ are expressed by the equations (22), (24) and (26) as described above.

$$L_K = (-1/J_B)C_0 + \Delta K/J_B \tag{22}$$

$$L_{JR} = -\Delta J_R/J_R \tag{24}$$

$$L_{JB} = (-1/J_B)C_1 - \Delta J_B/J_B \tag{26}$$

The predetermined relationships indicated above are represented by respective data tables stored in the ROM 49.

When the disturbance observer 52 is activated for the first time after the power-on switch of the vehicle has been turned on, the nominal values of the spring constant K and moments of inertia $J_R$, $J_B$ are used. Once the amounts of change $\Delta K$, $\Delta J_R$ and $\Delta J_B$ are obtained by the constant compensator 60, the disturbance observer 52 uses the values K, $J_R$ and $J_B$ which have been compensated by the amounts $\Delta K$, $\Delta J_R$ and $\Delta J_B$. The amounts of change $\Delta K$, $\Delta J_R$ and $\Delta J_B$ obtained in the following cycles of execution of the routines of FIGS. 10–12 are the amounts of changes from the compensated values obtained in the preceding cycles.

On the other hand, the judging processor 62 requires the amounts of change $\Delta K$, $\Delta J_R$ and $\Delta J_B$ from the nominal values of K, $J_R$, $J_B$. To this end, memories are provided in the RAM 50 for storing cumulative amounts of changes $\Delta K$, $\Delta J_R$ and $\Delta J_B$, and these memories are cleared when the power-on switch is turned on. The amounts of changes (i.e., compensating values) $\Delta K$, $\Delta J_R$ and $\Delta J_B$ obtained by the constant compensator 60 are added to the contents of the appropriate memories each time the constant compensator 60 is operated.

The judging processor 62 is adapted to compare the cumulative amount of change (cumulative compensating value) $\Delta K$ stored in the appropriate memory of the RAM 50, with a predetermined reference value $\Delta K_0$ stored in the ROM 49. The reference value $\Delta K_0$ is a negative value. If the cumulative compensating value $\Delta K$ is smaller than the negative reference value $\Delta K_0$, this means that the air pressure of the tire 26 is abnormally low, and the display device 66 provides an indication informing the vehicle operator of this fact. In this respect, it is noted that the ROM 49 stores a data table representative of a relationship between the compensating value $\Delta K$ and an amount of change $\Delta P$ of the air pressure $P$ of the tire 26, so that the amount of change $\Delta P$ of the air pressure $P$ can be determined on the basis of the present compensating value $\Delta K$ and according to the $\Delta K$–$\Delta P$ relationship.

Similarly, the judging processor 62 compares the cumulative amount of change or compensating value $\Delta J_B$ stored in the appropriate memory of the RAM 50, with a predetermined positive reference value $\Delta J_{B0}$. If the compensating value $\Delta J_B$ is larger than the positive reference value $\Delta J_{B0}$, this means that a foreign matter is attached to the tire 26, for instance, a stone is inserted in a tread groove of the tire 26, and a suitable indication is provided on the display device 66 to inform the vehicle operator of this fact.

Further, the compensating value $\Delta J_B$ is compared with a predetermined negative reference value $\Delta J_{B0}$. If the value $\Delta J_B$ is smaller than the reference value $\Delta J_{B0}$, this means that the amount of wear of the tire 26 exceeds a tolerable upper limit, requiring the tire 26 to be replaced. In this case, an indication is provided on the display device 66 to inform the vehicle operator of this fact. If none of the two abnormal conditions of the tire 26 is detected by the judging processor 62, this means that the moment of inertia $J_B$ of the tire 26 (belt 30) does not suffer from an excessive change, and the processor 62 does not activate the display device 66.

The wheel speed generator 64 provides an output representative of the wheel speed $v$ as compensated on the basis of the disturbance estimated by the disturbance observer 52.

The disturbance $w_{2p}$ estimated by the disturbance observer 52 according to the above equation (11) is expressed by the above equation (8), namely, $w_{2p} = (-1/J_B)T_d + (\Delta K/J_B)\theta_{RB}$. The second term of the right member of the equation (8) is successively compensated by the constant compensator 60, and therefore will not vary abruptly or at a high rate. This means that the second term of the right member is negligibly small as compared with the first term of the same member. Accordingly, the wheel speed generator compensates the wheel speed $v$ on the assumption that the estimated disturbance value $w_{2p}$ obtained by the disturbance observer 52 according to the above equation (11) is equal to $(-1/J_B)T_d$.

Described in detail, the disturbance torque $T_d$ is obtained by multiplying the estimated disturbance $w_{2p} = (-1/J_B)T_d$ by $-J_B$, and then the angular velocity $\omega_{Rp}$ of the rim 28 which is caused solely by the disturbance torque $T_d$ is estimated according to the following equation (27)

$$\omega_{Rp}(s) = \{[D](s[I]-[E])^{-1}[F]\}T_d(s) \tag{27}$$

where,

[I]: unit (identity) matrix, s: Laplace operator, $\omega_{Rp}(s)$: value obtained by Laplace transform from the estimated angular velocity $\omega_{Rp}$, $T_d(s)$: value obtained by Laplace transform from the disturbance torque $T_d$.

The [D], [E] and [F] are vectors and a matrix expressed by the following equations:

$$[D] = [\,1 \quad 0 \quad 0\,]$$

$$[E] = \begin{bmatrix} 0 & 0 & -K/J_R \\ 0 & 0 & K/J_B \\ 1 & -1 & 0 \end{bmatrix}$$

$$[F] = [\,0 \quad -1/J_B \quad 0\,]^T$$

The estimated angular velocity $\omega_{Rp}$ is one of the components causing the speed variation of the tired wheel 14, which one component is caused by the disturbance given to the wheel 14 from the road surface irregularity. The estimated angular velocity $\omega_{Rp}$ is converted into the corresponding peripheral speed of the wheel 14, and the wheel speed $v$ received from the rim speed calculator/compensator 45 is compensated by the amount corresponding to the calculated peripheral speed, whereby the noise due to the disturbance from the road surface is eliminated from the wheel speed $v$.

It will be understood from the foregoing description of the present embodiment that the rotor 10, magnetic pickup 12, waveform shaper 18 and the calculator of the rim speed calculator/compensator 45 cooperate to provide a device for detecting the rotating speed (angular velocity) of the tired wheel 14.

It will also be understood that portions of the correlation calculator 56 and normalizer 58 which are assigned to obtain the amounts of change of the moments of inertia $J_R$, $J_B$ of the rim 28 and the belt 30 constitute means for detecting those amounts of change. Further, a portion of the constant compensator 60 constitutes means for compensating the moments of inertia $J_R$, $J_B$.

The vehicle speed sensor 70 functions as means for detecting the running speed V of the vehicle, and a portion of the rim speed calculator/compensator 45 constitutes means for calculating a difference (V–v) of the wheel speed $v$ from the vehicle speed V, which difference is considered to be a speed variation inherent to or characteristic of the tired wheel 14. Further, a portion of the calculator/compensator 45 assigned to obtain the specific wheel speed variation (V–v) for each of the teeth 16 of the rotor 10 constitutes means for estimating an amount of periodic variation of the wheel speed $v$. The compensator of the rim speed calculator/compensator 45 functions as means for compensating the wheel speed $v$ as determined by the output of the magnetic pickup 12, namely, means for compensating the angular velocity of the wheel 14.

In the embodiment which has been described in detail, the routines of FIGS. 10–12 are executed to obtain respective pairs of cross-correlation and auto-correlation functions at a predetermined time interval (necessary for the integer "i" to become equal to "M", "P" or "Q"), and the obtained cross- and auto-correlation functions are processed by the normalizer 58. However, these routines may be modified as needed. For example, the routine of FIG. 10 for calculating the correlations for obtaining the amount of change of the spring constant K of the torsion spring 32 may be replaced by a routine illustrated in the flow chart of FIG. 13, wherein a value LK(i) is obtained in step S54. Like the normalized value $L_K$ described above, the value $L_{K(i)}$ is used by the constant compensator 60 and the judging processor 62 to compensate the constant K and make the determination on the air pressure of the tire 26.

The value $L_{K(i)}$ is represented by the following equation:

$$L_{K(i)} = \frac{\sum_{j=1}^{i}(W_{2p(j)}\theta_{RBp(j)})}{\sum_{j=1}^{i}(\theta_{RBp(j)}^2)}$$

The above equation may be converted into the following equation:

$$L_{K(i)} = \frac{\sum_{j=1}^{i-1}(W_{2p(j)}\theta_{RBp(j)}) + W_{2p(i)}\theta_{RBp(i)}}{\sum_{j=1}^{i-1}(\theta_{RBp(j)}^2) + \theta_{RBp(i)}^2}$$

The above equation may be represented by the following equation (28) including $L_{K(i-1)}$:

$$L_{K(i)} = \frac{L_{K(i-1)} + (W_{2p(i)}\theta_{RBp(i)})F_{(i-1)}}{1 + (\theta_{RBp(i)}^2)F_{(i-1)}} \quad (28)$$

where, $$F_{(i-1)} = \frac{1}{\sum_{i=1}^{i-1}(\theta_{RBp(i)}^2)}$$

The value $F_{(i-1)}$ may be represented by the following equation:

$$F_{(i-1)} = \frac{1}{\sum_{i=1}^{i-2}(\theta_{RBp(i)}^2) + \theta_{RBP(i-1)}^2}$$

The above equation may be represented by the following equation (29) including $F_{(i-2)}$:

$$F_{(i-1)} = \frac{F_{(i-2)}}{1 + F_{(i-2)}\theta_{RBp(i-1)}^2} \quad (29)$$

Figure 13:
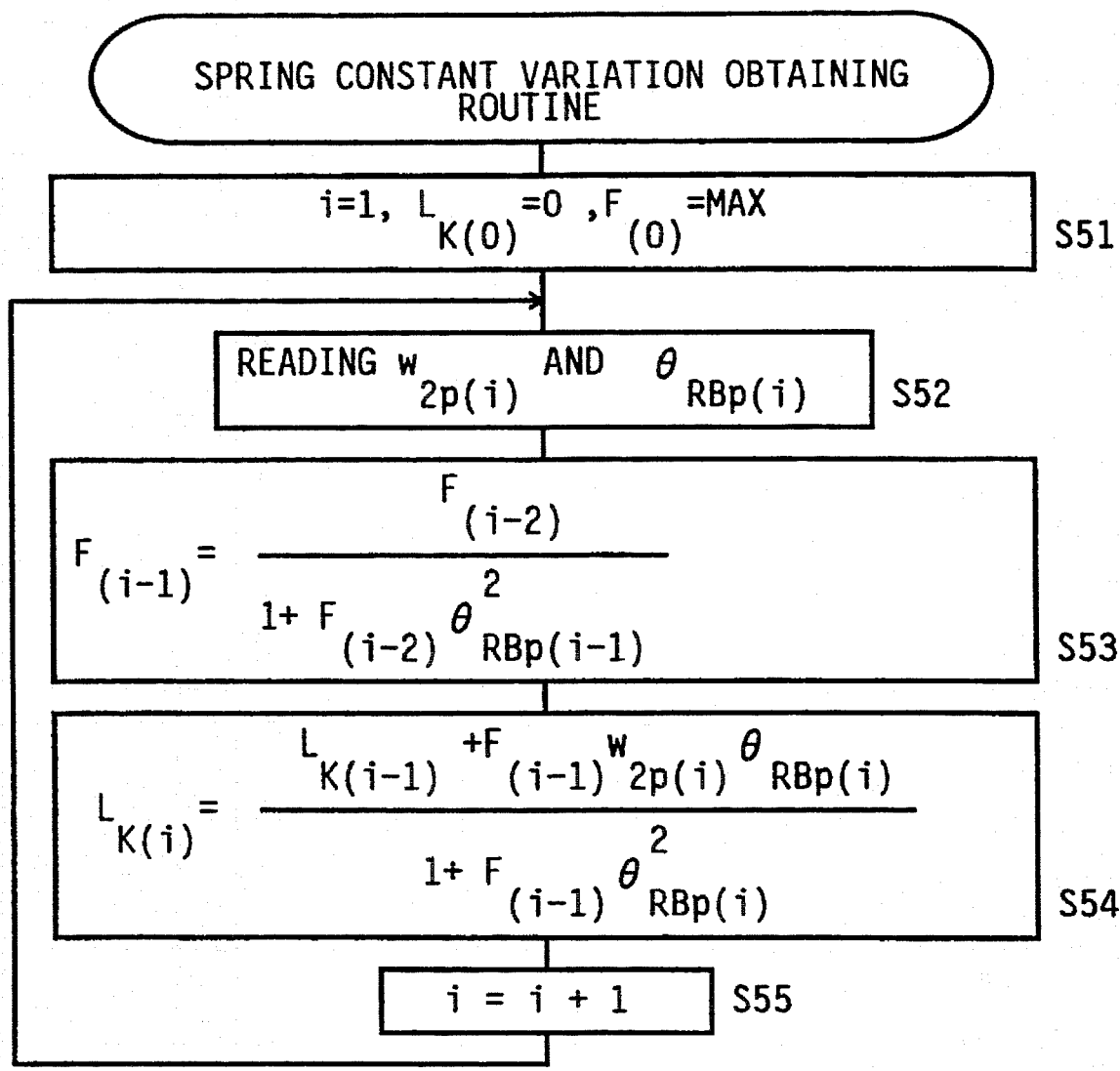
FIG. 13 is a flow chart illustrating a routine corresponding to that of FIG. 10, which is used in another embodiment of this invention.

The routine of FIG. 13 for obtaining the amount of change of the spring constant K according to the second embodiment is based on the theory expressed by the above equations. The routine is initiated with step S51 to set the integer "i" to "1", a value $L_{K(0)}$ to "0", and a value $F_{(0)}$ to a maximum value "MAX". Step S52 is then implemented to read from the RAM 50 the estimated disturbance value $w_{2p}$ and estimated torsion angle value $\theta_{RBp}$ which have been obtained last. These values $w_{2p}$ and $\theta_{RBp}$ are defined as $w_{2p(i)}$ and $\theta_{RBp(i)}$. Then, the control flow goes to step S53 to calculate the value $F_{(i-1)}$, and to step S54 to calculate the value $L_{K(i)}$. Step S55 is then implemented to increment the integer "i". Thus, one cycle of execution of the routine is terminated.

In the first embodiment, the accuracy of the disturbance observer 52 of estimating the disturbance is improved by compensation of the wheel speed v by the rim speed calculator/compensator 45 to eliminate the periodic speed variation of the tired wheel 14 due to errors of the wheel 14 and the rotor 10 during manufacture and assembling thereof. However, this compensation is not essential according to the principle of the present invention. However, it is difficult to design the disturbance observer 52 so that its disturbance estimating accuracy is sufficiently high over the entire range of the variation frequency of the wheel speed v, namely, the frequency of the wave which represents the periodic variation of the wheel speed v. In other words, there is a certain range of the variation frequency $f_d$ of the wheel speed v in which the estimating accuracy of the disturbance observer 52 is sufficiently high. Therefore, it is necessary to take a suitable measure for avoiding an influence of the periodic wheel speed variation. On the other hand, it is possible to estimate by calculation the speed variation frequency $f_d$, that is, the frequency $f_d$ at which the speed v of the tired wheel 14 periodically varies due to the periodic disturbance acting on the wheel 14. Accordingly, it is possible to estimate an undesirable range of the wheel speed v in which the accuracy of the disturbance observer 52 is undesirably low. This range can be estimated by estimating the wheel speed variation frequency $f_d$ from the actually detected wheel speed v, and comparing this variation frequency $f_d$ with a known optimum variation frequency $f_{opt}$ at which the accuracy of the observer 52 is highest. If a difference between the actual variation frequency $f_d$ and the optimum variation frequency $f_{opt}$ is smaller than a predetermined lower limit, the wheel speed v is considered to be within the undesirable range. It is thus possible and desirable to inhibit the operation of the disturbance observer 52 while the wheel speed v is in the estimated undesirable range, so that the operating reliability of the observer 52 is enhanced.

Figure 14:
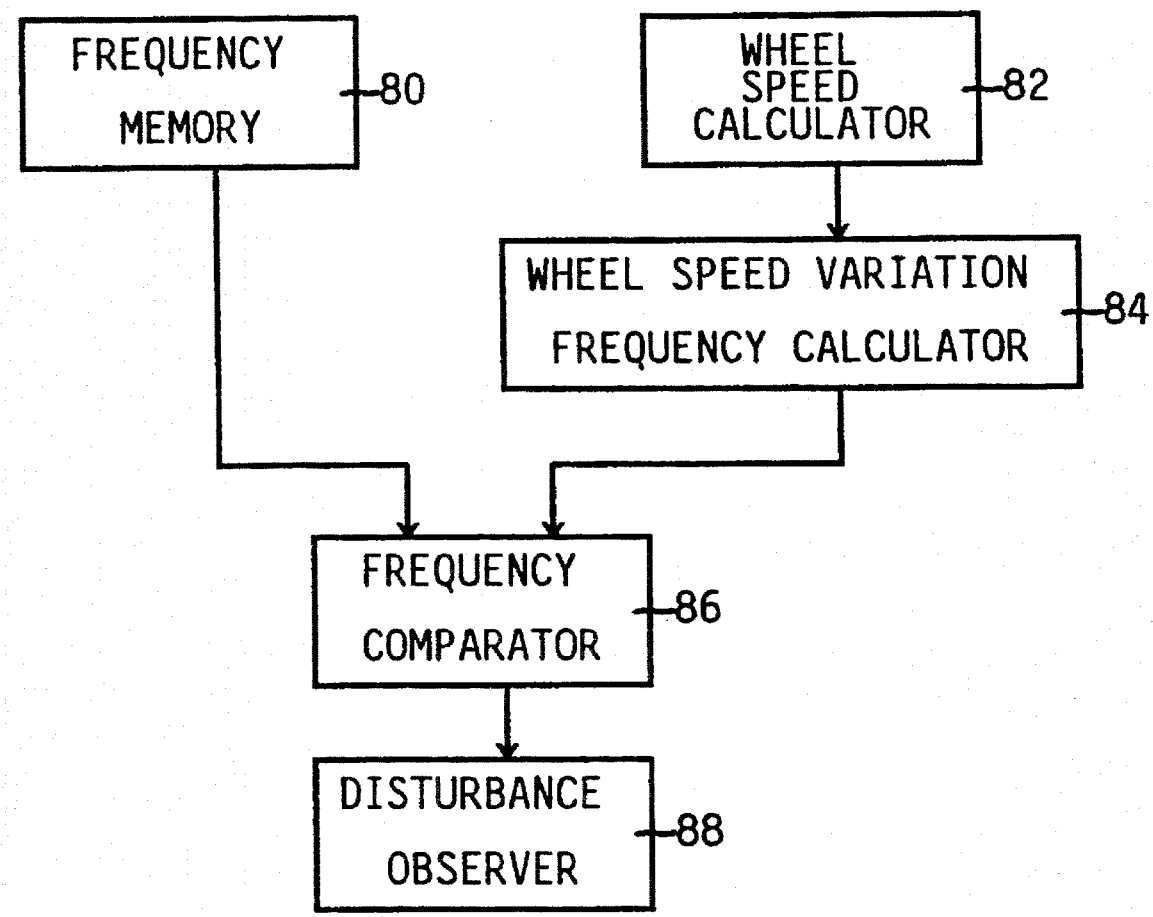
FIG. 14 is a block diagram illustrating the functional elements of a disturbance detecting apparatus constructed according to a further embodiment of the invention.

An example of an arrangement based on the above concept according to a third embodiment of the invention is illustrated in the block diagram of FIG. 14, which includes a frequency memory 80, a wheel speed calculator 82, a wheel speed variation frequency calculator 84, a frequency comparator 86 and a disturbance observer 88.

The frequency memory 80 stores data indicative of the optimum variation frequency $f_{opt}$ at which the disturbance observer 88 can estimate the amounts of change of the spring constant K, moments of inertia $J_R$, $J_B$, etc. with sufficiently high accuracy. In this respect, it is noted that a common optimum variation frequency $f_{opt}$ is used for all of the variables (including K, $J_R$, $J_B$) to be estimated by the observer 88, or respective optimum variation frequency values $f_{opt}$ are provided for the different variables.

The wheel speed variation frequency calculator 84 calculates the variation frequency $f_d$ of the wheel speed in the following manner:

At first, the number n of revolutions of the tired wheel 14 is calculated according to the following equation:

$n = TV/(2\pi R)$ where,

T: constant,

V: current speed of the vehicle,

R: radius of the tired wheel 14 when the air pressure of the tire 26 is normal.

Then, a basic frequency $f_0$ of the wheel speed with respect to the current vehicle speed V is calculated according to the following equation:

$f_0 = 1/n$

The basic frequency $f_0$ is the lowest one of different frequencies of a plurality of sine waves which are considered to form a composite sine wave representative of the periodic variation of the wheel speed.

There are other variation frequencies $f_d$ of the wheel speed due to the periodic disturbance acting on the wheel 14, for instance, higher harmonic waves of the basic frequency $f_0$. Since the frequencies of the higher harmonic waves are multiples of $f_0$, the variation frequency $f_d$ can be calculated according to the following equation:

$f_d = if_0$ (where i is a natural number ≥ 2)

Figure 15:
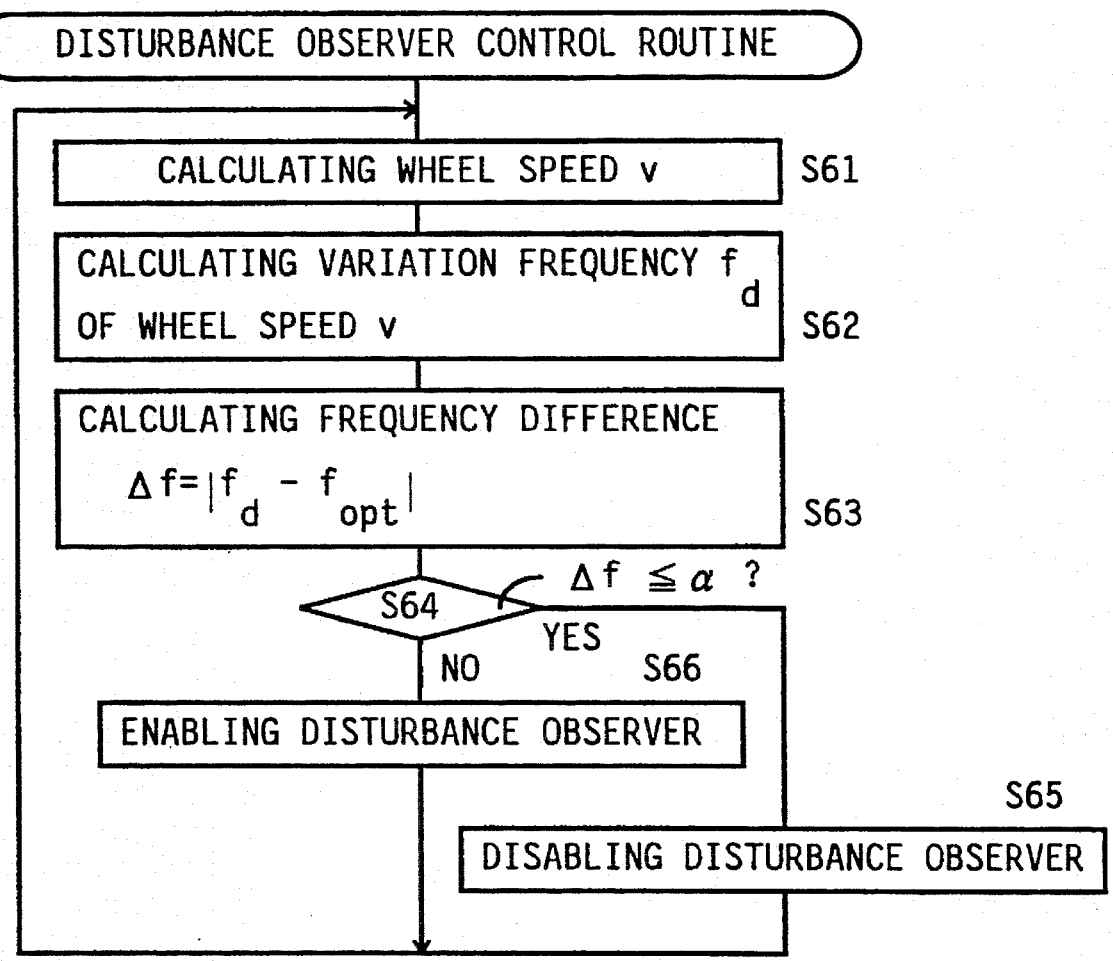
FIG. 15 is a flow chart illustrating a disturbance observer control routine according to a control program stored in a read-only memory of a computer used by the apparatus of FIG. 14.

The wheel speed calculator 82, wheel speed variation frequency calculator 84, frequency comparator 86 and disturbance observer 88 are operated so as to execute a disturbance observer control routine illustrated in the flow chart of FIG. 15, according to a control program stored in the ROM 49 of the computer 47.

The routine of FIG. 15 is initiated with step S61 to calculate the wheel speed v of the tired wheel 14 on the basis of the output signal of the magnetic pickup 12. The manner of calculation of the wheel speed v in step S61 is the same as the manner of calculation of the average wheel speed v by the rim speed calculator/compensator 45 in step S12 of the routine of FIG. 6.

Step S61 is followed by step S62 in which the two or more variation frequencies $f_d$ of the wheel speed v are calculated as described above, using the wheel speed v calculated in step S61. Then, step S63 is implemented to calculate the absolute value of a difference Δf between each calculated variation frequency $f_d$ and the corresponding optimum frequency $f_{opt}$ stored in the frequency memory 80. Then, the control flow goes to step S64 to determine whether the difference Δf (absolute value) is equal to or smaller than a predetermined reference α, or not. If an affirmative decision (YES) is obtained in step S64 for any one of the variation frequencies $f_d$, step S65 is implemented to inhibit the operation of the disturbance observer 88, namely, disable the observer 88. In the other cases, step S66 is implemented to permit the operation of the observer 88, namely, enable the observer 88. This disturbance observer 88 is identical in construction with the disturbance observer 52 used in the first embodiment.

In the present third embodiment, the rotor 10, magnetic pickup 12, waveform shaper 18 and wheel speed calculator 82 cooperate to constitute a device for detecting the angular velocity of the tired wheel 14, while the frequency memory 80, wheel speed variation frequency calculator 84 and frequency comparator 86 cooperate to constitute means for inhibiting the operation of the disturbance observer 88.

If it is assumed that the periodic disturbance influencing the wheel speed v arises solely from the errors associated with the tired wheel 14 and the rotor 10, the frequency of the periodic disturbance can be considered to depend entirely on the wheel speed v, that is, the vehicle speed V. Therefore, the determination as to whether the disturbance observer can estimate the disturbance with high accuracy or not can be made based on the currently detected wheel speed v or vehicle speed V per se, rather than on the currently detected variation frequency $f_d$ as compared with the optimum variation frequency $f_{opt}$.

While the dynamic model of the tired wheel 14 for designing the disturbance observer is shown in FIG. 4 by way of example, the disturbance observer may be designed according to other models.

Figure 16:
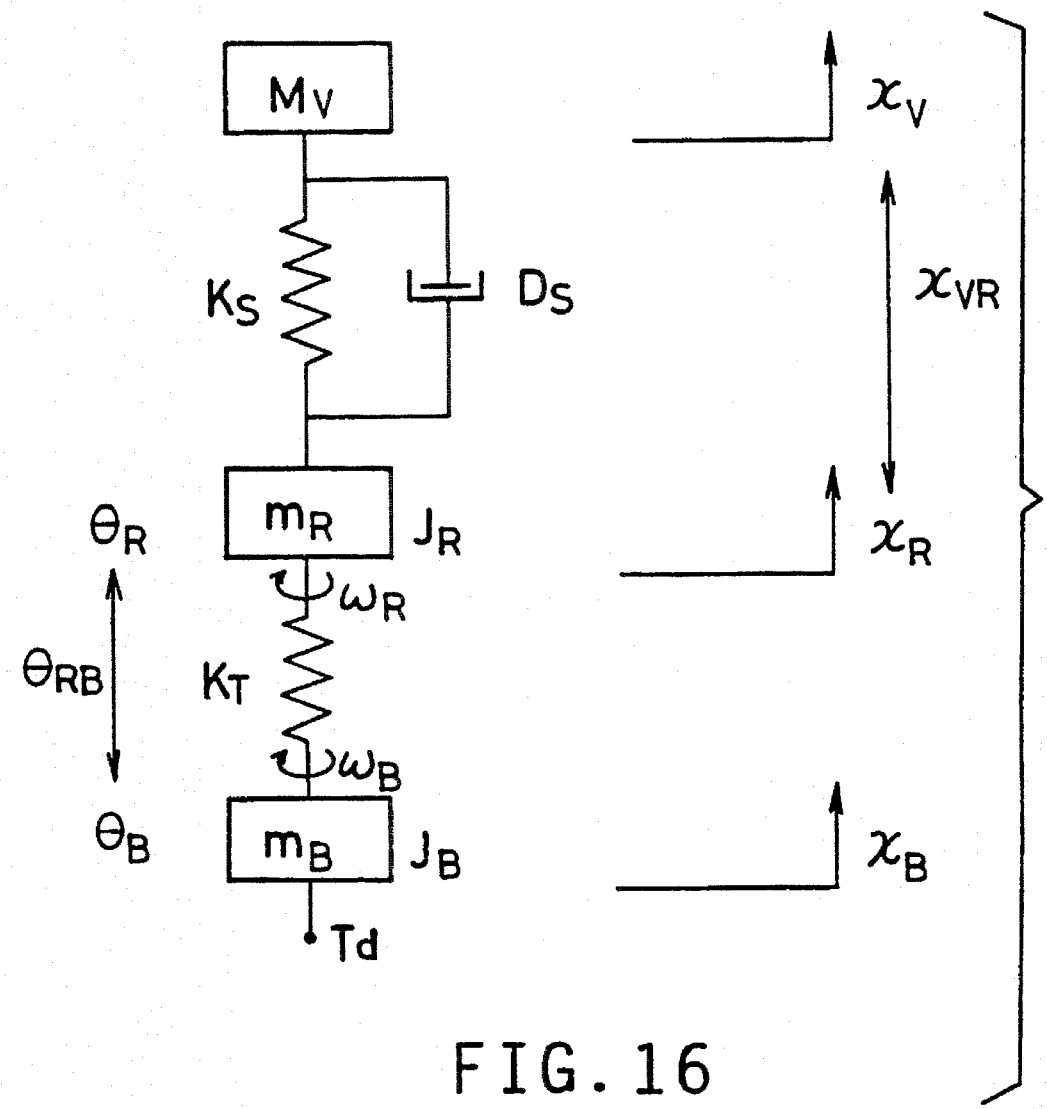
FIG. 16 is a view illustrating a dynamic model of a disturbance observer incorporated in a still further embodiment of the present invention.

For instance, the tired wheel 14 connected to a vehicle suspension system may be modeled as illustrated in FIG. 16.

Reference characters used in FIG. 16 represent the following:

$M_V$: sprung vehicle body mass,
$m_R$: mass of the rim 28,
$m_B$: mass of the belt 30,
$K_S$: spring constant of the vehicle suspension,
$D_S$: damping coefficient of the vehicle suspension,
$x_V$: displacement of the sprung vehicle body,
$x_R$: displacement of the rim 28,
$x_B$: displacement of the belt 30,
$x_{VR}$: difference between $x_V$ and $x_R$.

The characters $J_R$, $J_B$ and $\theta_{RB}$ represent the moments of inertia of the rim 28 and the belt 30, and the torsion angle between the rim and the belt 28, 30, respectively, as in the first embodiment. While $K_T$ represents the spring constant K of the torsion spring 32, the subscript T is used with the character K to distinguish the spring constant $K_T$ from the spring constant $K_S$ of the vehicle suspension system.

There will be described various embodiments of the present invention which use the disturbance observer according to the model of FIG. 16. In these embodiments, the same reference numerals as used in FIG. 1 will be used to identify the corresponding elements, and no redundant description of these elements will be provided in the interest of brevity and simplification.

The model of FIG. 16 is represented by the following equation of state (30):

$$\begin{bmatrix} \omega_R' \\ \omega_B' \\ \theta_{RB}' \\ X_V'' \\ X_R'' \\ X_{VR}' \end{bmatrix} = \begin{bmatrix} 0 & 0 & K_T/J_R & a_{11} & a_{12} & a_{13} \\ 0 & 0 & -K_T/J_B & a_{21} & a_{22} & a_{23} \\ 1 & -1 & 0 & a_{31} & a_{32} & a_{33} \\ b_{11} & b_{12} & b_{13} & D_S/M_V & -D_S/M_V & K_S/M_V \\ b_{21} & b_{22} & b_{23} & -D_S/m_R & D_S/m_R & -K_S/m_R \\ b_{31} & b_{32} & b_{33} & -1 & 1 & 0 \end{bmatrix} \begin{bmatrix} \omega_R \\ \omega_B \\ \theta_{RB} \\ X_V' \\ X_R' \\ X_{VR} \end{bmatrix} + \begin{bmatrix} 0 \\ (-1/J_B)T_d \\ 0 \\ 0 \\ 0 \\ (K_T/m_R)X_B \end{bmatrix} \quad (30)$$

where, $J_R = \gamma m_R$, and $J_B = \beta m_B$, and $a_{ij}$ and $b_{ij}$ are constants indicative of an interference between the model of the tired wheel and the model of the vehicle suspension system. These constants depend on the construction of the vehicle suspension system.

Assuming that the mass $m_R$ (moment of inertia $J_R$) of the rim 28 and the torsion spring constant $K_T$ are both changed to $m_R + \Delta m_R$ ($J_R + \Delta J_R$) and $K_T + \Delta K_T$, respectively, the above state equation (30) can be converted into the following equation (31), which represents an equivalent state of the model in which a disturbance acts on the model placed in its normal state:

$$\begin{bmatrix} \omega_R' \\ \omega_B' \\ \theta_{RB}' \\ X_V'' \\ X_R'' \\ X_{VR}' \end{bmatrix} = \quad (31)$$

-continued $$\begin{bmatrix} 0 & 0 & K_T/J_R & a_{11} & a_{12} & a_{13} \\ 0 & 0 & -K_T/J_B & a_{21} & a_{22} & a_{23} \\ 1 & -1 & 0 & a_{31} & a_{32} & a_{33} \\ b_{11} & b_{12} & b_{13} & D_S/M_V & -D_S/M_V & K_S/M_V \\ b_{21} & b_{22} & b_{23} & -D_S/m_R & D_S/m_R & -K_S/m_R \\ b_{31} & b_{32} & b_{33} & -1 & 1 & 0 \end{bmatrix} \begin{bmatrix} \omega_R \\ \omega_B \\ \theta_{RB} \\ X_V' \\ X_R' \\ X_{VR} \end{bmatrix} +$$

$$\begin{bmatrix} 0 \\ (-1/J_B)T_d \\ 0 \\ 0 \\ 0 \\ (K_T/m_R)X_B \end{bmatrix} + \begin{bmatrix} -\Delta(K_T/J_R)\theta_{RB} \\ 0 \\ 0 \\ 0 \\ \Delta(D_S/m_R)X_{VR}' + \Delta(K_S/m_R)X_{VR} \\ 0 \end{bmatrix}$$

where, $$\Delta(K_T/J_R) = (K_T + \Delta K_T)/(J_R + \Delta J_R) - K_T/J_R$$

$$\Delta(D_S/m_R) = D_S/(m_R + \Delta m_R) - D_S/m_R$$

$$\Delta(K_S/m_R) = K_S/(m_R + \Delta m_R) - K_S/m_R$$

If the third term of the right member of the above equation (31) is also treated as disturbances, and if the disturbance represented by the fifth element of that third term is to be estimated, that disturbance $w_5$ is represented by the following equation (32), and the following equation of state (33) represents the model.

$$w_5 = \Delta(D_S/m_R)X_{VR}' + \Delta(K_S/m_R)X_{VR} + n \quad (32)$$

where, "n" represents a term representative of an error which arises because only the fifth element of the third term of the right member of the equation (31) is used to estimate the disturbance.

$$\begin{bmatrix} \omega_R' \\ \omega_B' \\ \theta_{RB}' \\ X_V'' \\ X_R'' \\ X_{VR}' \end{bmatrix} = \quad (33)$$

$$\begin{bmatrix} 0 & 0 & -K_T/J_R & a_{11} & a_{12} & a_{13} \\ 0 & 0 & K_T/J_B & a_{21} & a_{22} & a_{23} \\ 1 & -1 & 0 & a_{31} & a_{32} & a_{33} \\ b_{11} & b_{12} & b_{13} & D_S/M_V & -D_S/M_V & K_S/M_V \\ b_{21} & b_{22} & b_{23} & -D_S/m_R & D_S/m_R & -K_S/m_R \\ b_{31} & b_{32} & b_{33} & -1 & 1 & 0 \end{bmatrix} \begin{bmatrix} \omega_R \\ \omega_B \\ \theta_{RB} \\ X_V' \\ X_R' \\ X_{VR} \end{bmatrix} +$$

$$\begin{bmatrix} 0 \\ 0 \\ 0 \\ 0 \\ 0 \\ 1 \\ 0 \end{bmatrix} w_5$$

A cross-correlation function $C(w_5, X_{VR})$ for obtaining the amount of change of the mass $m_R$ (consequently, the amount of change of the moment of inertia $J_R$) of the rim 28 from the disturbance $w_5$ represented by the equation (32) is represented by the following equation (34):

$$C(w_5, x_{VR}) = \Delta(D_S/m_R)C(x_{VR'}, x_{VR}) + \Delta(K_S/m_R)C(x_{VR}, x_{VR}) + C(n, x_{VR}) \quad (34)$$

Since $C(x_{VR}', x_{VR}) = 0$, the following equation (35) may be obtained by normalization, namely, by dividing the cross-correlation function $C(w_5, x_{VR})$ by an auto-correlation function $C(x_{VR}, x_{VR})$:

$$C(w_5, x_{VR})/C(x_{VR}, x_{VR}) = C(n, x_{VR})/C(x_{VR}, x_{VR}) + \Delta(K_S/m_R) \quad (35)$$

The first term of the right member of the above equation (35) is independent of a change of the mass $m_R$ (moment of inertia $J_R$), and can be suitably determined. The amount of change $\Delta J_R$ of the moment of inertia $J_R$ can be obtained from the amount of change of the mass $m_R$ which is obtained as described above. The thus obtained amount of change $\Delta J_R$ is used to compensate or adjust the moment of inertia $J_R$ used by the disturbance observer 52.

The disturbance observer 52 is identical in construction with that described above with respect to the first embodiment, except for the following:

If the disturbance to be estimated is approximated as $w_5' = 0$, an expanded system is represented by the following equation (36):

$$\begin{bmatrix} \omega_R' \\ \omega_B' \\ \theta_{RB}' \\ X_V'' \\ X_R'' \\ X_{VR}' \\ w_5' \end{bmatrix} = \quad (36)$$

$$\begin{bmatrix} 0 & 0 & -K_T/J_R & a_{11} & a_{12} & a_{13} & 0 \\ 0 & 0 & K_T/J_B & a_{21} & a_{22} & a_{23} & 0 \\ 1 & -1 & 0 & a_{31} & a_{32} & a_{33} & 0 \\ b_{11} & b_{12} & b_{13} & D_S/M_V & -D_S/M_V & K_S/M_V & 0 \\ b_{21} & b_{22} & b_{23} & -D_S/m_R & D_S/m_R & -K_S/m_R & 1 \\ b_{31} & b_{32} & b_{33} & -1 & 1 & 0 & 0 \\ 0 & 0 & 0 & 0 & 0 & 0 & 0 \end{bmatrix} \times \begin{bmatrix} \omega_R \\ \omega_B \\ \theta_{RB} \\ X_V' \\ X_R' \\ X_{VR} \\ w_5 \end{bmatrix}$$

Of the physical values in the above equation (36), only the angular velocity $\omega_R$ of the rim 28 can be detected.

The disturbance observer can be formulated in the same manner as described above, by re-defining the matrices in the above equation (36) as follows:

$$[X_a] = \omega_R$$
$$[X_b] = [\omega_B \; \theta_{RB} \; X_V' \; X_R' \; X_{VR} \; w_5]^T$$
$$[A_{11}] = 0$$
$$[A_{12}] = [0 \; -K_T/J_R \; a_{11} \; a_{12} \; a_{13} \; 0]^T$$
$$[A_{21}] = [0 \; 1 \; b_{11} \; b_{21} \; b_{31} \; 0]$$

$$[A_{22}] = \begin{bmatrix} 0 & K_T/J_B & a_{21} & a_{22} & a_{23} & 0 \\ -1 & 0 & a_{31} & a_{32} & a_{33} & 0 \\ b_{12} & b_{13} & D_S/M_V & -D_S/M_V & K_S/M_V & 0 \\ b_{22} & b_{23} & -D_S/m_R & D_S/m_R & -K_S/m_R & 1 \\ b_{32} & b_{33} & -1 & 1 & 0 & 0 \\ 0 & 0 & 0 & 0 & 0 & 0 \end{bmatrix}$$

While only the angular velocity $\omega_R$ of the rim 28 can be detected in the present embodiment, the disturbance estimating accuracy of the disturbance observer 52 can be improved if the other physical value or values is/are detected by suitable detecting means and used by the observer.

In essence, the present embodiment is adapted such that the disturbance observer 52 estimates the disturbance $w_5$ on the basis of the moment of inertia $J_R$ of the rim 28, moment of inertia $J_B$ of the belt 30, mass $m_R$ of the rim 28, mass $m_B$ of the belt 30, angular velocity $\omega_R$ of the rim 28, spring constant $K_S$ and damping coefficient $D_S$ of the vehicle suspension system, and mass $M_V$ of the sprung vehicle body, so that the amount of change $\Delta m_R$ of the mass $m_R$ of the rim 28 is calculated from the estimated disturbance $w_5$ by the correlation functions and normalization, and so that the amount of change $\Delta J_R$ of the moment of inertia $J_R$ of the rim 28 is determined on the basis of the calculated amount of change $\Delta m_R$ and according to a predetermined relationship between $\Delta m_R$ and $\Delta J_R$. The present embodiment permits accurate estimation of the amount of change $\Delta m_R$ of the mass $m_R$ of the rim 28 irrespective of the amount of change $\Delta K_T$ of the spring constant $K_T$, even if a change of the spring constant $K_T$ due to a change of the air pressure of the tire 26 takes place simultaneously with a change of the mass $m_R$ of the rim 28.

Figure 17:
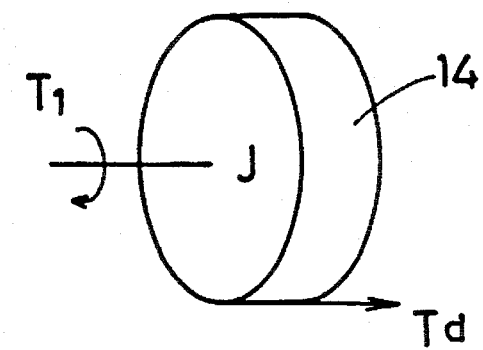
FIG. 17 is a view illustrating a dynamic model of a disturbance observer incorporated in a yet further embodiment of the invention.

The dynamic model used for designing the disturbance observer may be simplified as illustrated in FIG. 17. While the dynamic models of the tired wheel 14 shown in FIGS. 3 and 16 includes the rim 28 and the belt 30 whose moments of inertia and angular velocities are used to estimate the disturbance acting on the wheel 14, the dynamic model of FIG. 17 is a simple rotary body having a moment of inertia J. According to this model, too, the disturbance torque $T_d$ can be estimated based on the moment of inertia J and angular velocity of the rotary body. For instance, the model of FIG. 17 can be realized by using in the model of FIG. 3 the torsion spring 32 whose spring constant K is as large as possible. This embodiment is another form of the invention different from that of the preceding embodiments in which the disturbance observer is designed according to the model of FIG. 3 or 16.

In the preceding embodiments, the display device 66 is adapted to provide an indication informing the vehicle operator of an abnormally low level of the air pressure or an excessive amount of wear of the tire 26. However, the judging processor 62 and the display device 66 may be modified so that the display device 66 indicates an expected time or distance (mileage) of running of the vehicle that is possible without replacing the tire 26 or increasing its air pressure. This expected running time or distance can be determined by the rate of decrease of the air pressure or rate of increase of the wear amount of the tire 26.

For example, the rate of decrease of the air pressure of the tire 26 can be obtained from the rate of change of the spring constant K, which can be obtained by dividing the amount of change $\Delta K$ by a time period t for which the amount of change $\Delta K$ has occurred. The expected vehicle running time can be estimated from the thus obtained rate of change $\Delta K/t$ and is displayed on the display device 66.

The rate of increase of the wear amount of the tire 26 can be obtained from the rate of change of the moment of inertia $J_B$ of the belt 30, which can be obtained by dividing the amount of change $\Delta J_B$ of the moment of inertia $J_B$ by a running distance d which has caused the amount of change $\Delta J_B$. The expected vehicle running distance can be estimated from the thus obtained rate of change $\Delta J_B/d$ and is displayed on the display device 66.

Although the vehicle speed sensor 70 is exclusively used to detect the vehicle speed V in the embodiments described above, the wheel speed detecting device 10, 12, 18, 45 may be utilized to determine the vehicle speed V. Namely, the vehicle speed V is determined or estimated based on the wheel speed v. In this respect, it is noted that the absolute value of the rate of change of the wheel speed v is larger than that of the vehicle speed V, since the tired wheel 14 has a comparatively small moment of inertia while the vehicle body has a comparatively large inertial mass. Therefore, when the vehicle speed V is estimated from the wheel speed v, it is necessary to limit the estimated vehicle speed V to a predetermined upper limit if the wheel speed v changes at a rate higher than an expected maximum rate of change of the vehicle speed V. Alternatively, the vehicle speed V should be estimated from an average value of the wheel speed v during a sufficiently long length of time. It is desirable that the vehicle speed V be estimated from the speed values v of the two or more tired wheels 14.

In the illustrated embodiments, the display device 66 provides an indication that a foreign matter is attached to the tire 26, in the case where the amount of change $\Delta J_B$ of the moment of inertia $J_B$ from the nominal value exceeds a positive reference value $\Delta J_{B0}$. However, the moment of inertia $J_B$ increases also when the tire 26 is equipped with a chain to prevent slipping of the tire 26 on the road surface. This means that the amount of change $\Delta J_B$ may be utilized to determine whether the tire 26 is equipped with a chain or not.

Figure 18:
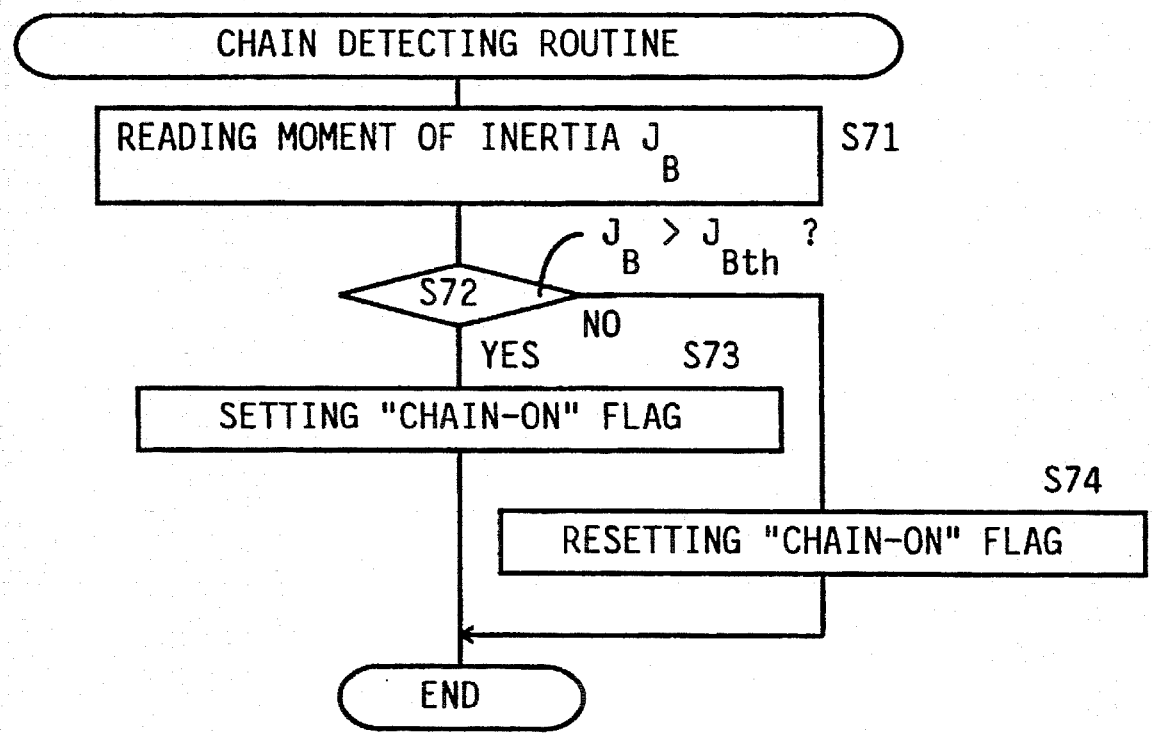
FIG. 18 is a flow chart illustrating a routine for detecting a chain installed on the tired wheel, according to a control program stored in a read-only memory of a computer used by a chain detecting device provided as one form of the disturbance detecting apparatus of the invention.

An example of a routine for detecting a chain installed on the tire 26 is illustrated in the flow chart of FIG. 18. This routine is executed for each of the tired wheels 14.

The routine is initiated with step S71 to read the last value of the moment of inertia $J_B$ from the RAM 50. Step S71 is followed by step S72 to determine whether the moment of inertia $J_B$ is larger than a predetermined threshold value $J_{Bth}$. This threshold value $J_{Bth}$ is determined based on an amount of increase of the moment of inertia $J_B$ that generally takes place when the tired wheel 14 is equipped with a chain. If the currently detected moment of inertia $J_B$ is not larger than the threshold value $J_{Bth}$, a negative decision (NO) is obtained in step S72, and the control flow goes to step S74 to reset a CHAIN-ON flag to "0". The value "1" of this CHAIN-ON flag indicates the installation of a chain on the tire 26, while the value "0" indicates that a chain is not installed on the tire 26. If the moment of inertia $J_B$ is larger than the threshold value $J_{Bth}$, an affirmative decision (YES) is obtained in step S72, and step S73 is implemented to set the CHAIN-ON flag to "1". Thus, the routine is terminated with step S73 or S74 to set or reset the flag.

The CHAIN-ON flag is provided in the RAM 50 of the computer 47, and the state of the flag is monitored by a suitable vehicle control device connected to the computer 47. This vehicle control device is adapted to control the vehicle differently depending upon whether chains are installed on the tires 26 of the wheels 14.

As an example of the vehicle control device, there is available a rear steering angle control device designed to electrically control the steering angle of the rear wheels of the vehicle. There will be described an application of the chain detecting routine of FIG. 18 to the rear steering angle control device.

When a chain is installed on the rear wheel tire 26, the clearance between the tire 26 and a wheel housing of the vehicle body which covers the tire 26 is smaller than that when the chain is not installed on the tire 26. If the steering angle of the rear wheel 14 was regulated uniformly irrespective of whether the rear wheel tire 26 is equipped with the chain or not, the chain installed on the tire 26 would be excessively close to the wheel housing and might interfere with the wheel housing. Therefore, the rear steering angle control device is designed not to control the steering angle of the rear wheel 14 when the chain is installed on the tire 26. Alternatively, the device is designed to control the rear wheel steering angle such that the angle is smaller when the chain is installed than when the chain is not installed. Thus, the state of the CHAIN-ON flag is used by the rear steering angle control device to control the rear wheel steering angle in different manners depending upon whether the wheel is equipped with a chain or not.

Figure 19:
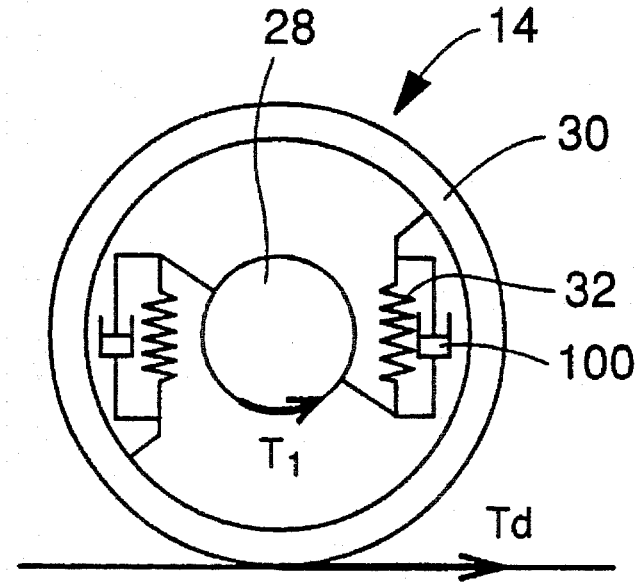
FIG. 19 is a view showing a dynamic model of a disturbance observer incorporated in still another embodiment of the invention.

Referring next to FIG. 19, there is shown another dynamic model of the tired wheel 14, wherein the mutually rotatable rim 28 and belt 30 are connected to each other by the torsion spring 32 and a damper 100 which are disposed in parallel.

Figure 20:
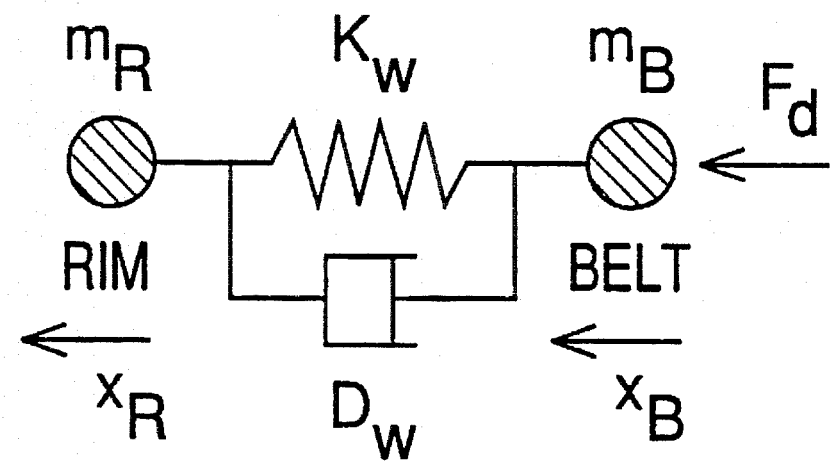
FIG. 20 is a simplified view of the dynamic model of FIG. 19.

The model of FIG. 19 may be simplified into a so-called "two-inertial model" as illustrated in FIG. 20.

The reference characters used in FIG. 20 represent the following:

$m_R$: equivalent inertial mass (weight) of the rim 28

$m_B$: equivalent inertial mass (weight) of the belt 30, $K_W$: spring constant of the torsion spring 32, $D_W$: damping coefficient of the damper 100, $x_R$: equivalent linear displacement of the rim 28, $x_B$: equivalent linear displacement of the belt 30, $X_{RB}$: equivalent relative linear displacement of the rim 28 and belt 30, $F_d$: equivalent disturbance received by the tire 26 from the road surface.

The equivalent inertial masses (weights) $m_R$, $m_B$ of the rim 28 and belt 30 in the model of FIG. 20 equivalently correspond to the moments of inertia $J_R$, $J_B$ in the model of FIG. 19, respectively, while the equivalent linear displacements $x_R$, $x_B$ of the rim 28 and belt 30 in the model of FIG. 20 equivalently correspond to the integrals of the angular velocities $\omega_R$, $\omega_B$ in the model of FIG. 19, respectively. The equivalent relative linear displacement $x_{RB}$ in the model of FIG. 20 equivalently corresponds to the torsion angle $\theta_{RB}$ in the model of FIG. 19. Further, the equivalent disturbance $F_d$ in the model of FIG. 20 equivalently corresponds to the disturbance torque $T_d$ in the model of FIG. 19. There will be described an embodiment of the invention according to the model of FIG. 20.

The dynamic model of FIG. 20 is represented by the following equation of state (37):

$$\begin{bmatrix} x_R'' \\ x_B'' \\ x_{RB}' \end{bmatrix} = \begin{bmatrix} -D_W/m_R & D_W/m_R & -K_W/m_R \\ D_W/m_B & -D_W/m_B & K_W/m_B \\ 1 & -1 & 0 \end{bmatrix} \begin{bmatrix} x_R' \\ x_B' \\ x_{RB} \end{bmatrix} + \begin{bmatrix} 0 \\ 1/m_B \\ 0 \end{bmatrix} F_d \quad (37)$$

The above state equation (37) does not include a parameter corresponding to the driving or braking torque $T_1$ which acts on the rim 28 based on an engine output or a braking force, because the equation (37) is formulated to include only variable parameters, with a particular attention drawn to vibrating movements of the model of FIG. 20. In this respect, the driving or braking torque $T_1$ can be considered a fixed value as distinguished from the variable parameters such as the equivalent linear displacements $x_R$, $x_B$, first derivatives $x_R'$, $x_B'$ and second derivatives $x_R''$, $x_B''$ of those values $x_R$, $x_B$, spring constant $K_W$, and damping coefficient $D_W$.

If the spring constant $K_W$ and damping coefficient $D_W$ are changed to $(K_W+\Delta K_W)$ and $(D_W+\Delta D_W)$, respectively, due to a change of the air pressure of the tire 26, the equation of state (37) can be converted into the following equation (38), which represents an equivalent state of the model in which a disturbance acts on the model placed in its normal state:

$$\begin{bmatrix} x_R'' \\ x_B'' \\ x_{RB}' \end{bmatrix} = \begin{bmatrix} -D_W/m_R & D_W/m_R & -K_W/m_R \\ D_W/m_B & -D_W/m_B & K_W/m_B \\ 1 & -1 & 0 \end{bmatrix} \begin{bmatrix} x_R' \\ x_B' \\ x_{RB} \end{bmatrix} + \begin{bmatrix} 0 \\ 1/m_B \\ 0 \end{bmatrix} F_d + \begin{bmatrix} -\Delta D_W/m_R \, (x_R'-x_B') - (\Delta K_W/m_R) x_{RB} \\ \Delta D_W/m_B \, (x_R'-x_B') + (\Delta K_W/m_B) x_{RB} \\ 0 \end{bmatrix} \quad (38)$$

If the equivalent disturbance $F_d$ is also treated as an unknown disturbance value that cannot be measured, the disturbance to be estimated is represented by the following equation (39):

$$[w] = \begin{bmatrix} 0 \\ 1/m_B \\ 0 \end{bmatrix} F_d + \begin{bmatrix} -\Delta D_W/m_R \, (x_R'-x_B') - (\Delta K_W/m_R) x_{RB} \\ \Delta D_W/m_B \, (x_R'-x_B') + (\Delta K_W/m_B) x_{RB} \\ 0 \end{bmatrix} \quad (39)$$

If the disturbance represented by the second elements of the right member of the above equation (39) is to be estimated, that disturbance $w_2$ is represented by the following equation (40):

$$w_2 = (\Delta D_W/m_B)(X_R'-X_B') + (\Delta K_W/m_B) X_{RB} + F_d/m_B + n \quad (40)$$

where, "n" represents a term representative of an error which arises because only the second elements are used to estimate the disturbance $w_2$.

Therefore, the following equation of state (41) represents the model when the air pressure of the tire 26 is changed:

$$\begin{bmatrix} X_R'' \\ X_B'' \\ X_{RB}' \end{bmatrix} = \quad (41)$$

-continued $$\begin{bmatrix} -D_W/m_R & D_W/m_R & -K_W/m_R \\ D_W/m_B & -D_W/m_B & K_W/m_B \\ 1 & -1 & 0 \end{bmatrix} \begin{bmatrix} x_R' \\ x_B' \\ x_{RB} \end{bmatrix} + \begin{bmatrix} 0 \\ 1 \\ 0 \end{bmatrix} w_2$$

A disturbance detecting apparatus according to the present embodiment is based on the above analysis, and uses a disturbance observer to estimate the disturbance $w_2$ for obtaining the amount of change of the air pressure of the tire 26. The present disturbance detecting apparatus is constructed as described below.

Figure 21:
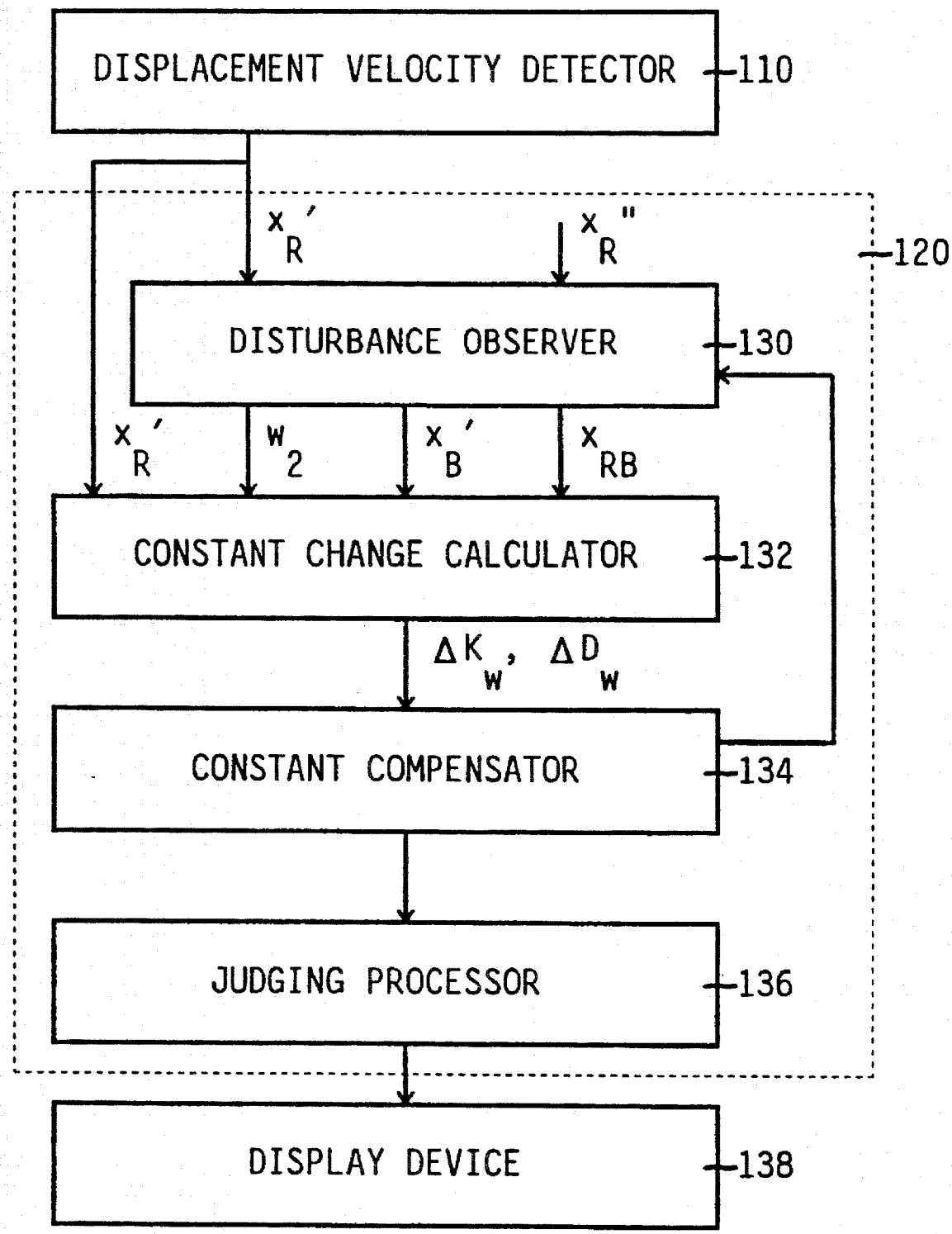
FIG. 21 is a block diagram showing the functional elements of the apparatus according to the embodiment of FIG. 19.
Figure 22:
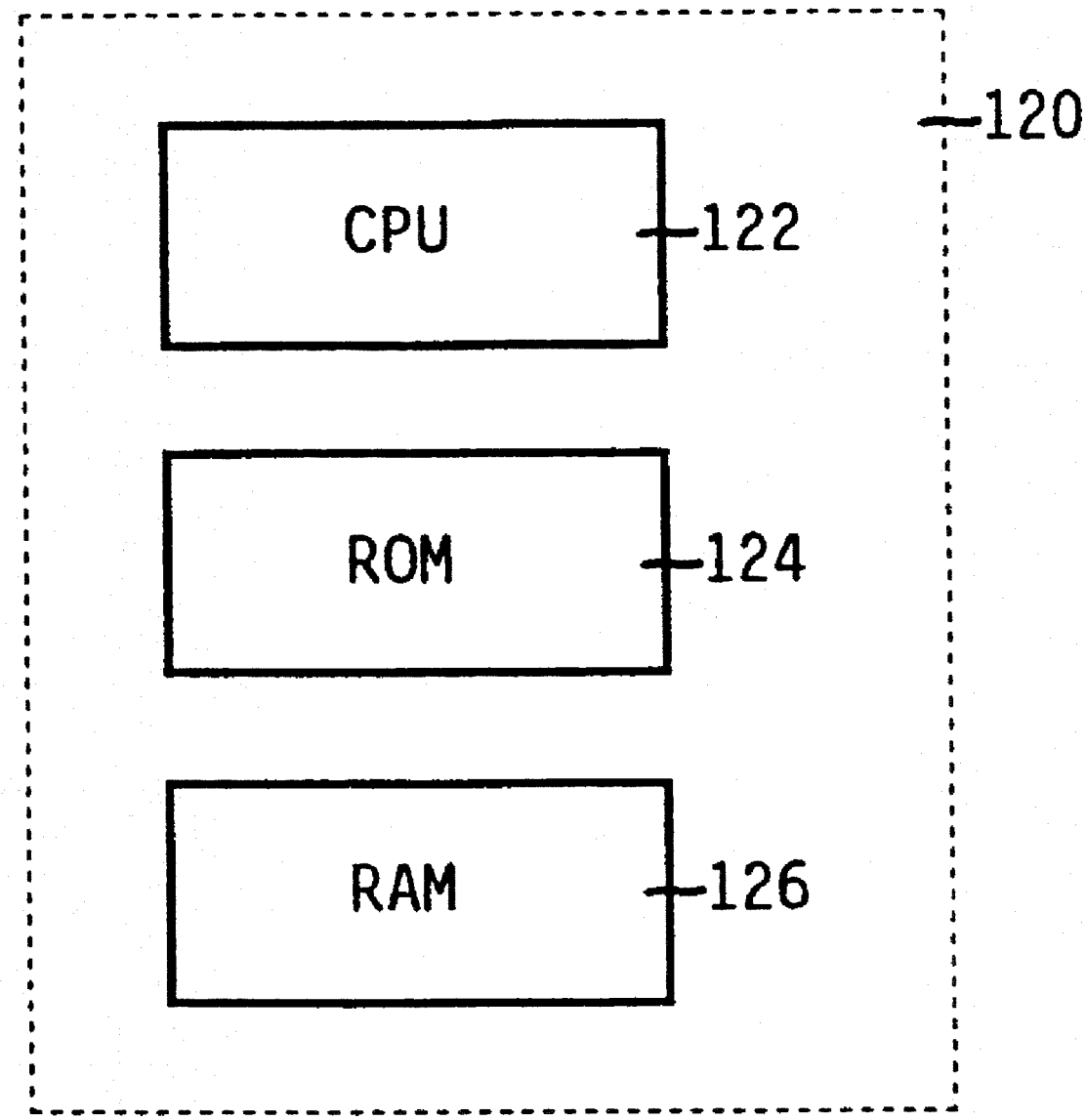
FIG. 22 is a block diagram depicting a computer used in the apparatus of FIG. 21.

The apparatus includes a displacement velocity detecting device 110 as illustrated in the functional block diagram of FIG. 21. The device 110 is adapted to detect an equivalent linear displacement velocity $x_R'$ of the rim 28, and is connected to a computer 120. The device 110 operates to determine the angular velocity $\omega_R$ of the rim 28 by magnetically detecting the passage of the teeth 16 formed along the outer periphery of the rotor 10, as in the preceding embodiments. The equivalent linear displacement velocity $x_R'$ is calculated on the basis of the determined angular velocity $\omega_R$. As shown in FIG. 22, the computer 120 incorporates a CPU 122 as a central processing unit, a ROM 124 as a first memory and a RAM 126 as a second memory. The computer 120 provides a disturbance observer 130, a constant change calculator 132, a constant compensator 134 and a judging processor 136, as indicated in FIG. 21.

The disturbance observer 130 is identical in construction with the disturbance observer 52 used in the first embodiment, except for the following:

If the disturbance to be estimated is approximated as $w_2'=0$, the expanded linear system represented by the above equation (41) is represented by the following equation (42):

$$\begin{bmatrix} x_R'' \\ x_B'' \\ x_{RB}' \\ w_2' \end{bmatrix} = \begin{bmatrix} -D_W/m_R & D_W/m_R & -K_W/m_R & 0 \\ D_W/m_B & -D_W/m_B & K_W/m_B & 1 \\ 1 & -1 & 0 & 0 \\ 0 & 0 & 0 & 0 \end{bmatrix} \begin{bmatrix} x_R' \\ x_B' \\ x_{RB} \\ w_2 \end{bmatrix} \quad (42)$$

Of the physical values in the above equation (42), only the equivalent linear displacement velocity $x_R'$ of the rim 28 can be detected.

The disturbance observer 130 can be formulated in the same manner as described above, by re-defining the matrices in the above equation (42) as follows:

$$\begin{aligned}
[x_a] &= x_R' \\
[x_b] &= [x_B' \quad x_{RB} \quad w_2]^T \\
[u] &= 0 \\
[A_{11}] &= -D_W/m_R \\
[A_{12}] &= [D_W/m_R \quad -K_W/m_R \quad 0] \\
[A_{21}] &= [D_W/m_B \quad 1 \quad 0]^T \\
[A_{22}] &= \begin{bmatrix} -D_W/m_B & K_W/m_B & 1 \\ -1 & 0 & 0 \\ 0 & 0 & 0 \end{bmatrix} \\
[B_1] &= 0 \\
[B_2] &= [0 \quad 0 \quad 0]^T
\end{aligned}$$

In essence, the present embodiment is adapted such that the disturbance observer 130 estimates the equivalent linear displacement velocity $x_B'$ and the equivalent relative linear displacement $x_{RB}$ of the linear system relating to the rotation of the tired wheel, on the basis of at least the equivalent linear displacement velocity $x_R'$ detected by the displacement velocity detector 110. The disturbance observer 130 also estimates the disturbance $w_2$ in the linear system. It will be understood that the detector 110 functions as a device for detecting the angular velocity of the rim 28.

The disturbance $w_2$ thus estimated by the disturbance observer 130 is applied to the constant change calculator 132, which is adapted to calculate an amount of change $\Delta K_W$ of the spring constant $K_W$ and an amount of change $\Delta D_W$ of the damping coefficient $D_W$, on the basis of the disturbance $w_2$.

As described above, $w_2=(\Delta D_W/m_B)(x_R'-x_B')+(\Delta K_W/m_B)X_{RB}+F_d/m_B+n$. This equation is used to calculate the amount of change $\Delta K_W$ and the amount of change $\Delta D_W$ by the least square method. Explained more specifically, the amounts of change $\Delta K_W$ and $\Delta D_W$ are determined such that a sum of the squares expressed by the following equation (43) is minimized, that is, such that values obtained by partial differentiation of the sum S by the respective amounts of change $\Delta K_W$ and $\Delta D_W$ are both zeroed.

$$S(\Delta K_W, \Delta D_W) = \sum_{i=1}^{N} \left( \frac{\Delta D_{W(i)}}{m_B} (x_{R'(i)} - x_{B'(i)}) + \frac{\Delta K_{W(i)}}{m_B} x_{RB(i)} + \frac{F_d}{m_B} - w_{2(i)} \right)^2 \quad (43)$$

The amounts of change $\Delta K_W$ and $\Delta D_W$ are calculated using the following equation (44):

$$\begin{bmatrix} \frac{\Delta K_W}{m_B} \\ \frac{\Delta D_W}{m_B} \end{bmatrix} = \left\{ \sum_{i=1}^{N} \begin{bmatrix} R_{1(i)} \\ R_{2(i)} \end{bmatrix} [R_{1(i)} \, R_{2(i)}] \right\}^{-1} \times \left\{ \sum_{i=1}^{N} \begin{bmatrix} R_{1(i)} \\ R_{2(i)} \end{bmatrix} w_{2(i)} \right\} \quad (44)$$

where, $$R_{1(i)} = x_{RB(i)}$$

$$R_{2(i)} = x_{R'(i)} - x_{B'(i)}$$

It will be understood that the amounts of change $\Delta K_W$ and $\Delta D_W$ are determined so that a sum of successively obtained squares of a difference of the estimated disturbance $w_2$ from a theoretical approximated value is minimized. In the above equation (43), a value within the parenthesis following $\Sigma$ is the above-indicated difference, and a sum of the first three terms preceding the last term "$w_{2(i)}$" within the parenthesis is the above-indicated theoretical approximated value of the disturbance $w_2$.

The amounts of change $\Delta K_W$ and $\Delta D_W$ obtained by the constant change calculator 132 are applied to the constant compensator 134, so that the spring constant $K_W$ and the damping coefficient $D_W$ are compensated or adjusted according to the obtained amounts of change $\Delta K_W$ and $\Delta D_W$.

The adjusted spring constant $K_W$ and damping coefficient $D_W$ obtained by the constant compensator 134 are applied to the judging processor 136, which first calculates differences of the adjusted spring constant $K_W$ and damping coefficient $D_W$ from the respective nominal values. These differences are used as absolute amounts of changes $\Delta K_W$ and $\Delta D_W$. Then, the judging processor 136 estimates the amount of change $\Delta P$ of the air pressure P of the tire from the nominal value, on the basis of the absolute amounts of change $\Delta K_W$ and $\Delta D_W$, and according to predetermined relationships between $\Delta K_W$, $\Delta D_W$ and P. These relationships are represented by data tables stored in the ROM 124 of the computer 120. Finally, the processor 136 determines whether the estimated amount of change $\Delta P$ of the air pressure is held within a tolerable range, and activates a display device 138 to provide an indication that the air pressure P of the tire is abnormal, if the estimated amount of change $\Delta P$ is not within the tolerable range.

The operation described above is performed according to a tire air pressure detecting routine stored in the ROM 124 of the computer 120. This routine will be described in detail by reference to the flow chart of FIG. 23.

The routine is initiated with step S81 to set the integer "i" to "1", and reset the amounts of change $\Delta K_{W(i)}$ and $\Delta D_{W(i)}$ to "0". Then, step S82 is implemented to calculate the equivalent linear displacement velocity $x_{R'(i)}$ of the rim 28 on the basis of the output of the displacement velocity detector 110, and store the calculated velocity $x_{R'(i)}$ in the RAM 126. Step S82 is followed by step S83 to calculate the equivalent linear displacement acceleration $x_{R''(i)}$, which is a difference between the present velocity value $x_{R'(i)}$ and the last velocity value $x_{R'(i-1)}$ previously stored in the RAM 126. The calculated equivalent linear displacement acceleration $x_{R''(i)}$ is also stored in the RAM 126.

The control flow then goes to step S84 in which the disturbance observer 130 estimates the disturbance $w_{2(i)}$, and the equivalent linear displacement velocity $x_{B'(i)}$ and equivalent relative linear displacement $x_{RB(i)}$ of the belt 30, on the basis of the equivalent linear displacement velocity $x_{R'(i)}$ and the equivalent linear displacement acceleration $x_{R''(i)}$. The estimated values $w_{w(i)}$, $x_{B'(i)}$ and $x_{RB(i)}$ are stored in the RAM 126.

While not only the equivalent linear displacement velocity $x_{R'(i)}$ but also the equivalent linear displacement acceleration $x_{R''(i)}$ are used to estimate the disturbance $w_{2(i)}$ and the equivalent linear displacement velocity $x_{B'(i)}$ and equivalent relative linear displacement $x_{RB(i)}$, only the equivalent linear displacement velocity $x_{R'(i)}$ may be used by the disturbance observer 130.

The disturbance observer 130 receives the equivalent linear displacement velocity and acceleration $x_{R'(i)}$, $x_{R''(i)}$ only after these inputs $x_{R'(i)}$, $x_{R''(i)}$ are filtered by a high-pass filter, so that only the variable components of the velocity and acceleration $x_{R'(i)}$, $x_{R''(i)}$ are used by the observer 130.

Then, step S85 is implemented to determine whether the integer "i" is equal to or larger than a predetermined value "N" or not. If not, a negative decision (NO) is obtained in step S85, and step S86 is implemented to increment the integer "i" to repeat the above steps S82–S85. With these steps S82–S85 repeated the predetermined number "N" of times a total of "N" sets of $x_{R'(i)}$, $x_{B'(i)}$, $w_{2(i)}$ and $x_{RB(i)}$ are stored in the RAM 126, and an affirmative decision (YES) is obtained in step S85. In this case, step S87 is implemented to calculate the amounts of change $\Delta K_{W(i)}$ and $\Delta D_{W(i)}$. More specifically, these amounts of change $\Delta K_{W(i)}$ and $\Delta D_{W(i)}$ are calculated by the least square method on the basis of the "N" sets of data indicated above. Step S87 is followed by step S88 to compensate the spring constant $K_W$ and damping coefficient $D_W$ used by the disturbance observer 130, on the basis of the calculated amounts of change $\Delta K_{W(i)}$ and $\Delta D_{W(i)}$.

Steps S89 and S90 are then implemented to determine whether the air pressure P of the tire 26 is abnormal or not. Described in detail, step S89 is first implemented to calculate the amount of change $\Delta K_W$ of the spring constant $K_W$ from the nominal value, and estimate the amount of change $\Delta P$ of the air pressure P from the nominal value, on the basis of the calculated amount of change $\Delta K_W$. For example, the estimation of the amount of change $\Delta P$ may be effected according to the following equation:

$$\Delta P = A(\Delta K_W/K_W)$$

where,
A: constant

Alternatively, the estimation of the amount of change $\Delta P$ may be made according to a predetermined relationship between $\Delta P$ and $\Delta K_W$, which is represented by a data table stored in the ROM 124.

Step S89 is followed by step S90 to determine whether the amount of change $\Delta P$ of the air pressure P exceeds a predetermined threshold value $\Delta P_{th}$, that is, whether the air pressure P is abnormal or not.

If the amount of change $\Delta P$ is not larger than the predetermined threshold $\Delta P_{th}$, namely, if the air pressure P is normal, step S92 to inform the vehicle operator of the abnormal air pressure P is not implemented. In this case, a negative decision (NO) is obtained in step S90, whereby step S91 is implemented to reset the integer "i" to "1", and the control flow returns to step S82 to execute the routine again. If the amount of change $\Delta P$ exceeds the threshold value $\Delta P_{th}$, an affirmative decision (YES) is obtained in step S90, and step S92 is implemented to activate the display device 138 to provide an indication that the air pressure P is abnormal. In this case, the execution of the routine is terminated with step S92.

Figure 23:
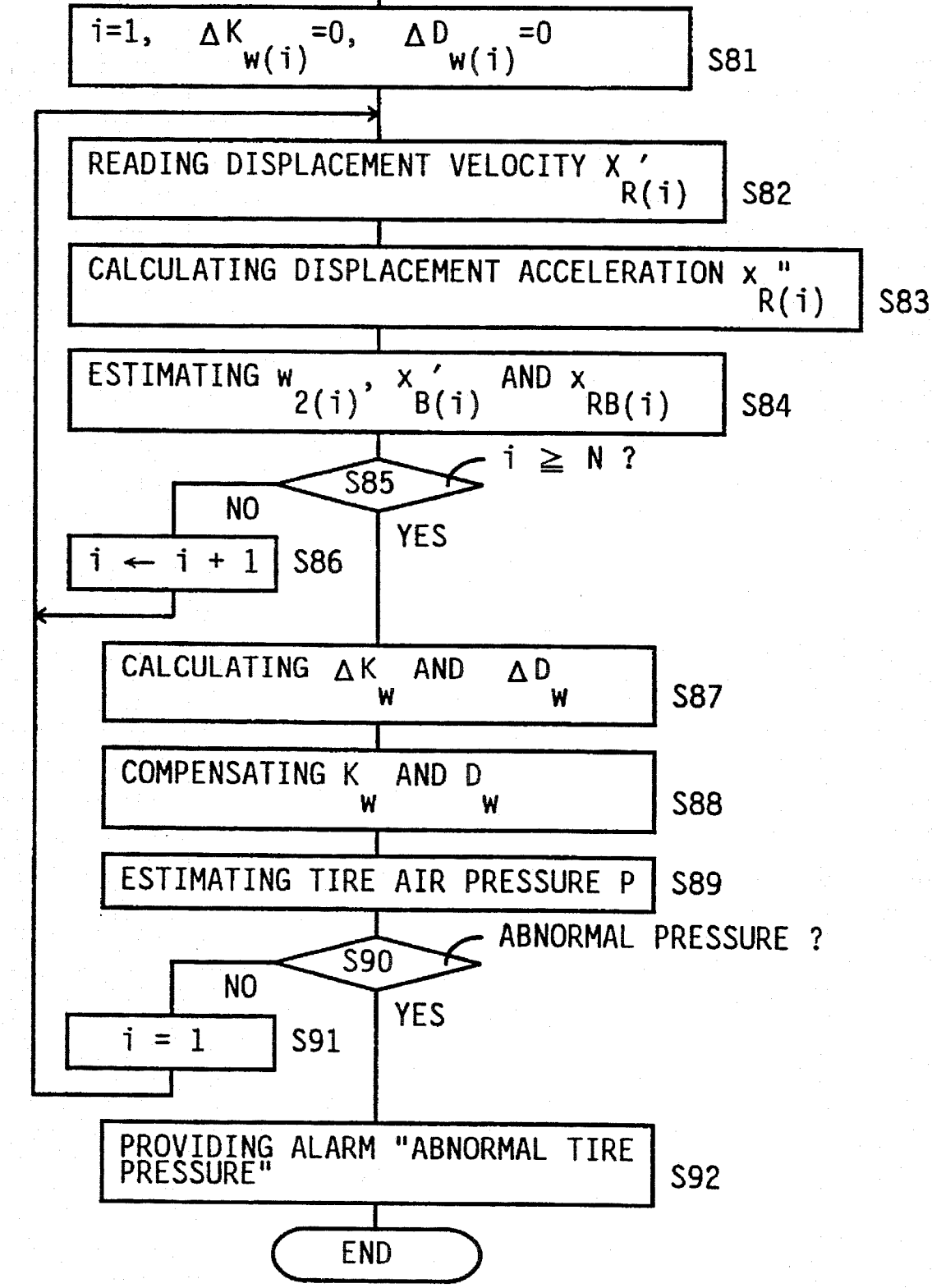
FIG. 23 is a flow chart illustrating a routine for detecting air pressure of the tired wheel according to a control program stored in the read-only memory of the computer of FIG. 22.

It will be understood that the tire air pressure detecting routine of FIG. 23 is formulated such that the amounts of change $\Delta K_W$ and $\Delta D_W$ are calculated each time the predetermined "N" sets of data $x_{R'(i)}$, $x_{B'(i)}$, $w_{2(i)}$ and $x_{RB(i)}$ have been stored in the RAM 126. However, the routine may be modified such that the amounts of change $\Delta K_W$ and $\Delta D_W$ are calculated each time a new set of those data has been stored in the RAM 126 after "N" sets of the data have been stored. In this case, the above equation (44) is modified so as to update the "N" sets of data such that the first stored set of data (oldest set of data) is replaced by the last stored set of data (newly obtained set of data). An example of such modified routine is illustrated in the flow chart of FIG. 24. This modified routine will be described, with a brief explanation of the steps similar to those of the routine of FIG. 23.

Figure 24:
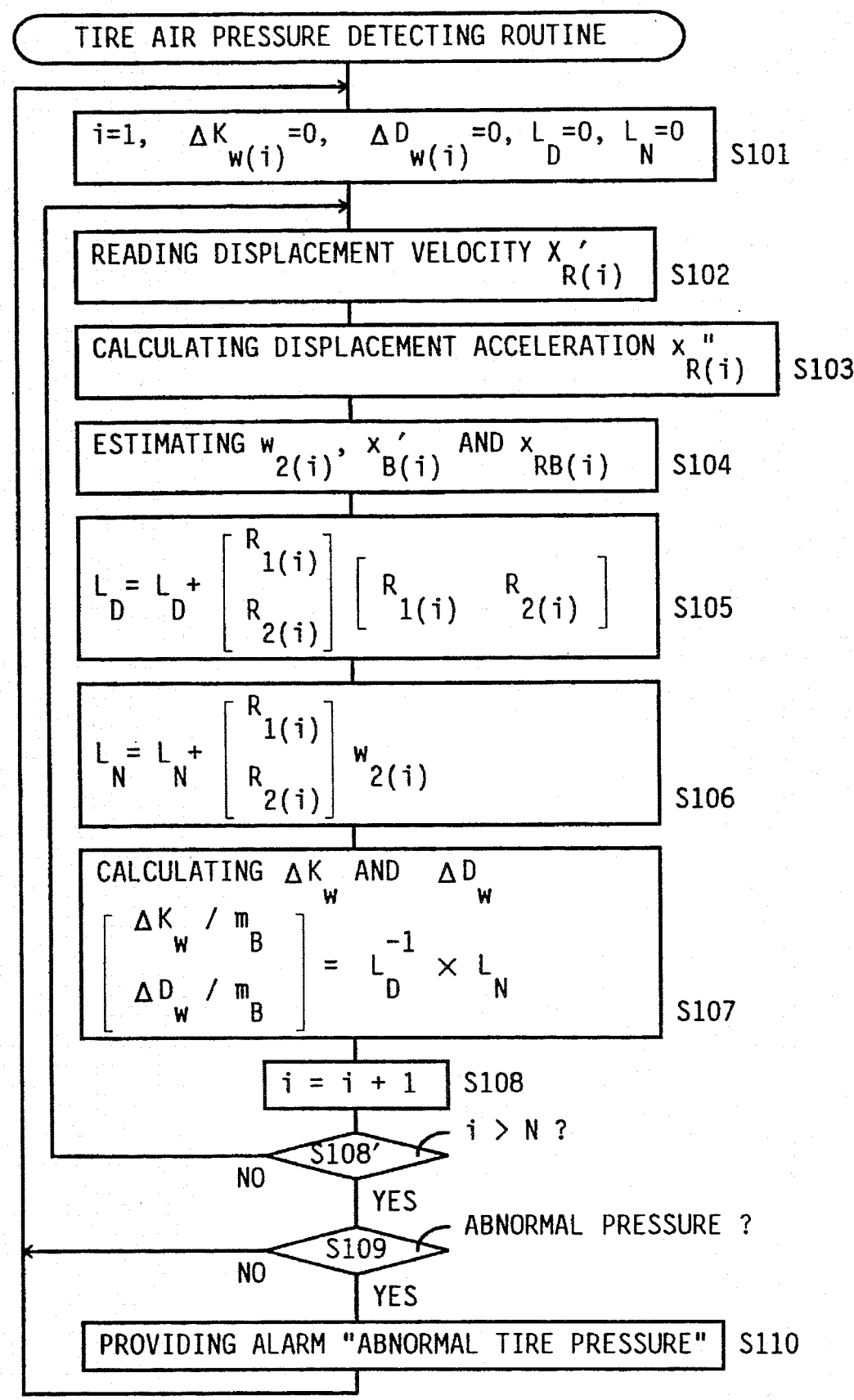
FIG. 24 is a flow chart illustrating a tire air pressure detecting routine according to yet another embodiment of the invention.

The routine of FIG. 24 is initiated with step S101 to set the integer "i" to "1", and zero not only the amounts of change $\Delta K_{W(i)}$ and $\Delta D_{W(i)}$ but also matrices $L_D$ and $L_N$. The matrix $L_D$ is represented by the left term of the right member of the above equation (44), while the matrix $L_N$ is represented by the right term of the right member of the equation (44).

Step S101 is followed by step S102 to read the equivalent linear displacement velocity $x_{R'(i)}$ on the represented by the output of the displacement velocity detector 110. Step S103 is then implemented to calculate the equivalent linear displacement acceleration $x_{R''(i)}$. Step S103 is followed by step S104 in which the disturbance observer 130 estimates the disturbance $w_{2(i)}$, the equivalent linear displacement velocity $x_{B'(i)}$ and the equivalent relative linear displacement $x_{RB(i)}$, on the basis of the variable components of the velocity and acceleration $x_{R'(i)}$, $x_{R''(i)}$.

The control flow then goes to step S105 to add to the present value of the matrix $L_D$ an increment based on the present values of the equivalent linear displacement velocities $x_{R'(i)}$, $x_{B'(i)}$ and the equivalent relative linear displacement $x_{RB(i)}$. Step S106 is then implemented to add to the present value of the matrix $L_N$ an increment based on the present values of $x_{R'(i)}$, $x_{B'(i)}$, $x_{RB(i)}$ and the present value of the disturbance $w_{2(i)}$. Thus, steps S105 and S106 are provided to update the matrices $L_D$ and $L_N$. Then, the control flow goes to step S107 to calculate the amounts of change $\Delta K_{W(i)}$ and $\Delta D_{W(i)}$ by inserting $L_D$ and $L_N$ in the equation (44), and also compensate or adjust the spring constant $K_W$ and the damping coefficient $D_W$ used by the observer 130, on the basis of the calculated amounts of change $\Delta K_{W(i)}$ and $\Delta D_{W(i)}$.

The control flow then goes to step S108 to increment the integer "i", and step S108' to determine whether the integer "i" is larger than a predetermined value "N" or not. If not, a negative decision (NO) is obtained in step S108' and the control flow goes back to step S102. If the integer "i" is larger than "N" an affirmative decision (YES) is obtained in step S108' and the control flow goes to step S109 to determine whether the air pressure P is abnormal or not, depending upon the adjusted spring constant $K_W$ as compared with the nominal value. If the air pressure P is found abnormal, step S110 is implemented to activate the display device 138 to inform the vehicle operator of the abnormal air pressure P.

While the present invention has been described in detail above in its presently preferred embodiments, it is to be understood that the present invention is not limited to the details of the illustrated embodiments, but may be embodied with various changes, modifications and improvements, which may occur to those skilled in the art, without departing from the scope of the invention defined in the following claims.

What is claimed is:

1. A disturbance detecting apparatus for detecting a disturbance acting on a tired wheel of a motor vehicle, comprising:

an angular velocity detecting device for detecting an angular velocity of the tired wheel; and a disturbance observer for estimating said disturbance acting on the tired wheel on the basis of at least said angular velocity of the tired wheel detected by said angular velocity detecting device, said disturbance observer estimating said disturbance as one of a plurality of variables in an equation of state indicative of a rotary motion of said tired wheel.

2. A method of compensating a value representative of an angular velocity of a tired wheel of a motor vehicle, comprising the steps of:

obtaining an amount of change of an angular velocity of the tired wheel on the basis of a disturbance acting on the wheel, which disturbance is detected by a disturbance detecting apparatus as defined in claim 1 and causes said amount of change of said angular velocity; and compensating the value representative of angular velocity of the tired wheel as detected by an angular velocity detecting device of said disturbance detecting apparatus, on the basis of said amount of change of the angular velocity.

3. A method of obtaining an amount of change of a moment of inertia of a tired wheel of a motor vehicle, comprising the steps of:

operating a disturbance detecting apparatus as defined in claim 1 to estimate an angular acceleration of said tired wheel as well as a disturbance acting on the tired wheel; and obtaining an amount of change of a moment of inertia of the tired wheel according to a relationship between said disturbance and said angular acceleration of the tired wheel.

4. A disturbance detecting apparatus according to claim 1, further comprising a torque detector for detecting at least one of a driving torque and a braking torque applied to said tired wheel, wherein said disturbance observer estimates said disturbance on the basis of at least said angular velocity of said tired wheel and said at least one of said driving and braking torques.

5. A disturbance detecting apparatus according to claim 1, further comprising means for obtaining a variable component of the angular velocity of the tired wheel detected by said angular velocity detecting device, wherein said disturbance observer estimates said disturbance on the basis of at least said variable component of the angular velocity of the tired wheel.

6. A disturbance detecting apparatus according to claim 1, wherein said disturbance observer is designed according to a dynamic model of said tired wheel in which a rim and a belt are connected to each other rotatably relative to each other by a torsion spring, said angular velocity detecting device detects an angular velocity of said rim, and said disturbance observer estimates said disturbance on the basis of at least said angular velocity of said rim.

7. A method of detecting a change of air pressure of a tired wheel of a motor vehicle, comprising the steps of:

operating a disturbance observer as defined in claim 6 to estimate a torsion angle between said rim and said belt as well as a disturbance acting on said tired wheel; and obtaining an amount of change of air pressure of the tired wheel according to a relationship between said disturbance and said torsion angle.

8. A method according to claim 7, wherein said step of obtaining an amount of change of air pressure of the tired wheel comprises obtaining successive normalized values of correlation each as a variable representative of a relationship between said disturbance and said torsion angle, by dividing respective ones of a plurality of cross-correlation functions between the disturbance and torsion angle successively obtained by said disturbance observer, by respective ones of a plurality of auto-correlation functions of the torsion angle successively obtained by the disturbance observer, such that a present one of said successive normalized values of correlation is obtained on the basis of a preceding one of said successive normalized values of correlation, an influence of a product of a present value of said disturbance and a present value of said torsion angle, and an influence of a square of said present value of said torsion angle.

9. A disturbance detecting apparatus according to claim 6, further comprising:

means for detecting an amount of change of a moment of inertia of said tired wheel; and means for compensating a value representative of said moment of inertia of said tired wheel used as a parameter by said disturbance observer, on the basis of the detected amount of change of said moment of inertia of the tired wheel.

10. A disturbance detecting apparatus according to claim 6, further comprising:

means for detecting an amount of change of a spring constant of said torsion spring; and means for compensating said spring constant used as a parameter by said disturbance observer, on the basis of the detected amount of change of said spring constant of said torsion spring.

11. A disturbance detecting apparatus according to claim 6, wherein said disturbance observer comprises means for estimating a disturbance $w_2$ and a torsion angle $\theta_{RB}$ between said rim and said belt, on the basis of at least said angular velocity $\omega_R$ of said rim, said apparatus further comprising a constant change detecting device for detecting an amount of change $\Delta K$ of a spring constant K of said torsion spring according to a relationship between said disturbance $w_2$ and said torsion angle $\theta_{RB}$ estimated by said disturbance observer, and wherein said disturbance $w_2$ is defined by the following equation:

$$w_2 = (-1/J_B)T_d + (\Delta K/J_B)\theta_{RB}$$

where, $J_B$: a moment of inertial of said belt; and $T_d$: a disturbance torque applied to said belt from a road surface on which the motor vehicle runs.

12. A disturbance detecting apparatus according to claim 11, further comprising air pressure detecting means for detecting an amount of change $\Delta P$ of the air pressure of said tired wheel which corresponds to the amount of change $\Delta K$ of the spring constant K of said torsion spring detected by said constant change detecting device, and according to a predetermined relationship between said amount of change $\Delta K$ and said amount of change $\Delta P$.

13. A disturbance detecting apparatus according to claim 11, further comprising means for compensating said spring constant K used as a parameter by said disturbance observer, on the basis of said amount of change $\Delta K$ of the spring constant K of said torsion spring detected by said constant change detecting device.

14. A disturbance detecting apparatus according to claim 6, wherein said disturbance observer comprises means for estimating a disturbance $w_2$ and an angular velocity $\omega_B$ of said belt, on the basis of at least said angular velocity $\omega_R$ of said rim, said apparatus further comprising a moment of inertia change detecting device for obtaining an angular acceleration $\omega_B'$ of said belt on the basis of said angular velocity $\omega_B$ of said belt estimated by said disturbance observer, and detecting an amount of change $\Delta J_B$ of a moment of inertia $J_B$ of said belt according to a relationship between said disturbance $w_2$ detected by said disturbance observer and said angular acceleration $\omega_B'$ of said belt, and wherein said disturbance $w_2$ is defined by the following equation:

$$w_2 = (-1/J_B)T_d - (\Delta J_B/J_B)\omega_B'$$

where, $T_d$: a disturbance torque applied to said belt from a road surface on which the motor vehicle runs.

15. A disturbance detecting apparatus according to claim 14, further comprising means for detecting a foreign matter attached to a tire of said tired wheel, on the basis of said amount of change $\Delta J_B$ of said moment of inertia $J_B$ of said belt detected by said moment of inertia change detecting device.

16. A disturbance detecting apparatus according to claim 14, further comprising means for detecting a chain installed on a tire of said tired wheel, on the basis of said amount of change $\Delta J_B$ of said moment of inertia $J_B$ of said belt detected by said moment of inertia change detecting device.

17. A disturbance detecting apparatus according to claim 14, further comprising means for detecting an amount of wear of a tire of said tired wheel, on the basis of said amount of change $\Delta J_B$ of said moment of inertia $J_B$ of said belt detected by said moment of inertia change detecting device.

18. A disturbance detecting apparatus according to claim 14, further comprising compensating means for compensating said moment of inertia $J_B$ of said belt used as a parameter by said disturbance observer, on the basis of said amount of change $\Delta J_B$ of said moment of inertia $J_B$ detected by said moment of inertia change detecting device.

19. A disturbance detecting apparatus according to claim 6, wherein said disturbance observer comprises means for estimating a disturbance $w_1$, on the basis of at least said angular velocity $\omega_R$ of said rim, said apparatus further comprising a moment of inertia change detecting device for obtaining an angular acceleration $\omega_R'$ of said rim on the basis of said angular velocity $\omega_R$ of said rim, and detecting an amount of change $\Delta J_R$ of a moment of inertia $J_R$ of said rim according to a relationship between said disturbance $w_1$ detected by said disturbance observer and said angular acceleration $\omega_R'$ of said rim, and wherein said disturbance $w_1$ is defined by the following equation:

$$w_1 = -(\Delta J_R/J_R)\omega_R'.$$

20. A disturbance detecting apparatus according to claim 19, wherein said tired wheel consists of a wheel member and a tire attached to said wheel member, said apparatus further comprising means for detecting replacement of said wheel member, on the basis of said amount of change $\Delta J_R$ of said moment of inertia $J_R$ of said rim detected by said moment of inertia change detecting device.

21. A disturbance detecting apparatus according to claim 1, wherein said disturbance observer is designed according to a dynamic model of said tired wheel in which a rim and a belt are connected to each other rotatably relative to each other by a torsion spring and a damper which are disposed in parallel, said angular velocity detecting device detects an angular velocity of said rim, and said disturbance observer estimates said disturbance on the basis of at least said angular velocity of said rim.

22. A disturbance detecting apparatus according to claim 21, wherein said disturbance observer uses said angular velocity of said rim as an equivalent linear displacement velocity $x_R'$ of said rim, and estimates a disturbance $w_2$, an equivalent linear displacement velocity $x_B'$ of said belt and an equivalent relative linear displacement $x_{RB}$ between said rim and belt, on the basis of at least said equivalent linear displacement velocity $x_R'$ of said rim, said apparatus further comprising a constant change detecting device for detecting an amount of change $\Delta D_W$ of a damping coefficient $D_W$ of said damper and an amount of change $\Delta K_W$ of a spring constant $K_W$ of said torsion spring, on the basis of said disturbance $w_2$, said equivalent linear displacement velocity $x_B'$, said equivalent relative linear displacement $x_{RB}$ which are estimated by said disturbance observer, and said equivalent linear displacement velocity $x_R'$ which is detected by said angular velocity detecting device, and wherein said disturbance $w_2$ is defined by the following equation:

$$w_2 = (\Delta D_W/m_B)(x_R' - x_B') + (\Delta K_W/m_B)x_{RB} + F_d/m_B,$$

where, $m_B$: equivalent inertial mass of said belt;

$F_d$: disturbance force equivalent to a disturbance torque applied to said belt from a road surface on which said vehicle runs.

23. A disturbance detecting apparatus according to claim 22, wherein said constant change detecting device detects said amount of change $\Delta D_W$ of said damping coefficient $D_W$ and said amount of change $\Delta K_W$ of said spring constant $K_W$ in such a manner that a sum of squares of a difference of the estimated disturbance $w_2$ from a theoretical approximated value of $(\Delta D_W/m_B)(x_R'-x_B')+(\Delta K_W/m_B)x_{RB}$, which squares are obtained at time intervals, is substantially minimized.

24. A disturbance detecting apparatus according to claim 1, wherein said disturbance observer is designed according to a dynamic model of said tired wheel connected to a suspension system of the vehicle, in which a sprung mass of the vehicle and said tired wheel as an unsprung mass of the vehicle are connected to each other movably relative to each other through said suspension system, and in which a rim and a belt are connected to each other rotatably relative to each other by a torsion spring, and said disturbance observer estimates said disturbance on the basis of at least said angular velocity of said tired wheel.

25. A disturbance detecting apparatus according to claim 1, further comprising an inhibiting device for inhibiting an operation of said disturbance observer when a difference between a frequency of a periodic variation of said angular velocity of said tired wheel and an optimum frequency at which said disturbance observer estimates said disturbance with high accuracy is not larger than a predetermined value.

26. A disturbance detecting apparatus according to claim 1, further comprising:

a vehicle speed sensor for detecting a running speed of the vehicle;

speed difference calculating means for calculating a difference between said running speed of the vehicle detected by said vehicle speed sensor and a peripheral speed of said tired wheel calculated on the basis of said angular velocity detected by said angular velocity detecting device;

periodic variation estimating means for estimating an amount of periodic variation of said peripheral speed of the tired wheel on the basis of said difference calculated by said speed difference calculating means; and compensating means for compensating a value representative of said peripheral speed of the tired wheel on the basis of said amount of periodic variation estimated by said periodic variation estimating means, said disturbance observer receiving the peripheral speed of the tired wheel which has been compensated by said compensating means.

* * * * *